United States Patent [19]

Peil et al.

[11] 4,350,930
[45] Sep. 21, 1982

[54] LIGHTING UNIT

[75] Inventors: William Peil, North Syracuse; Robert J. McFadyen, Syracuse, both of N.Y.

[73] Assignee: General Electric Company, Syracuse, N.Y.

[21] Appl. No.: 156,229

[22] Filed: Jun. 4, 1980

Related U.S. Application Data

[63] Continuation-in-part of Ser. No. 47,972, Jun. 13, 1979, abandoned.

[51] Int. Cl.³ .................... H01J 7/44; H01J 17/34; H01J 19/78; H01J 29/96
[52] U.S. Cl. ...................... 315/49; 315/DIG. 5; 315/DIG. 7; 315/180; 315/46; 315/92; 315/178
[58] Field of Search ............. 315/DIG. 5, DIG. 7, 315/178, 179, 180, 181, 182, 46, 49, 88, 92, 205

[56] References Cited

U.S. PATENT DOCUMENTS

| | | | |
|---|---|---|---|
| 3,582,708 | 6/1971 | Snyder | 315/92 |
| 3,659,146 | 4/1972 | Munson | 315/92 |
| 3,873,882 | 3/1975 | Gershen | 315/92 |
| 3,927,348 | 12/1975 | Zawadski | 315/180 |
| 4,100,462 | 7/1978 | McLellan | 315/179 |
| 4,151,445 | 4/1979 | Davenport et al. | 315/92 |
| 4,170,744 | 10/1979 | Hansler | 315/88 |
| 4,232,252 | 11/1980 | Peil | 315/92 |
| 4,236,100 | 11/1980 | Nuver | 315/DIG. 5 |
| 4,316,124 | 2/1982 | Verwimp et al. | 315/49 |

FOREIGN PATENT DOCUMENTS 2050090 12/1980 United Kingdom ............... 315/179

Primary Examiner—Saxfield Chatmon, Jr.
Attorney, Agent, or Firm—Richard V. Lang; Carl W. Baker

[57] ABSTRACT

A lighting unit is described utilizing an energy efficient metal vapor arc lamp as the main source of light supplemented by a standby filamentary light source producing light when the arc lamp is being started, the filament thereof serving as a resistive ballast for the arc lamp under normal operation. The lighting unit is designed as a more efficient replacement for the incandescent lamp. The lighting unit includes a rectifier for conversion of 60 hertz ac to dc, and a dc energized operating network, including a ferrite transformer and a transistor switch. The operating network produces an output adapted to each operating state of the arc lamp, including the provision of a high ignition potential, a power boost for the lamp during the glow to arc transition, warm-up and ballasting provisions, and means for sustaining the arc during transients which reduce the line voltage. The filamentary light source provides useful standby illumination while the arc lamp is being started, the amount being reduced to a low value as the arc lamp approaches normal light output.

44 Claims, 8 Drawing Figures

FIG. 3

| STATE OF LIGHTING UNIT | PREIGNITION | IGNITION | "GAT" BOOST | WARM UP | FINAL RUN |
|---|---|---|---|---|---|
| DURATION | 0 SECOND MIN. 45 SEC — 4 MIN. MAX. | 1 μSEC. MIN. 2 SECOND MAX. | 0.1–4 SECONDS | 30–90 SECONDS | — |
| POWER INPUT | 60 WATTS | 60 WATTS | 65 WATTS | 75–50 WATTS | 50 WATTS |
| DISCHARGE LAMP (11) | 1600V P-P AT ~50 KHz  0 DISSIPATION  0 LUMENS | 1600V P-P AT ~50 KHz  SMALL DISSIPATION  NEGLIGIBLE LUMENS | 150–500V P-P MAX. AT ~35 KHz  2–8 WATTS DISSIPATION  LOW LUMENS | 15–87 VDC  12–32 WATTS  LOW–FINAL LUMENS | 87 VDC  32 WATTS  2200 LUMENS |
| FILAMENTARY RESISTANCE (2) | 50 KHz PULSATING  ~56 WATTS  ~800 LUMENS | 50 KHz PULSATING  ~56 WATTS  ~800 LUMENS | 35 KHz PULSATING  ~56 WATTS  ~800 LUMENS | DC WITH 120 Hz RIPPLE  ~63–18 WATTS  ~800 LUMENS TO MIN. | DC WITH 120 Hz RIPPLE  18 WATTS  MIN. LUMENS |
| | PHASE I | | PHASE II | | PHASE III |

IONIZATION GLOW ESTABLISHED (between PHASE I and PHASE II)

THERMIONIC EMISSION ARC ESTABLISHED (between PHASE II and PHASE III)

FULL TEMPERATURE AND PRESSURE

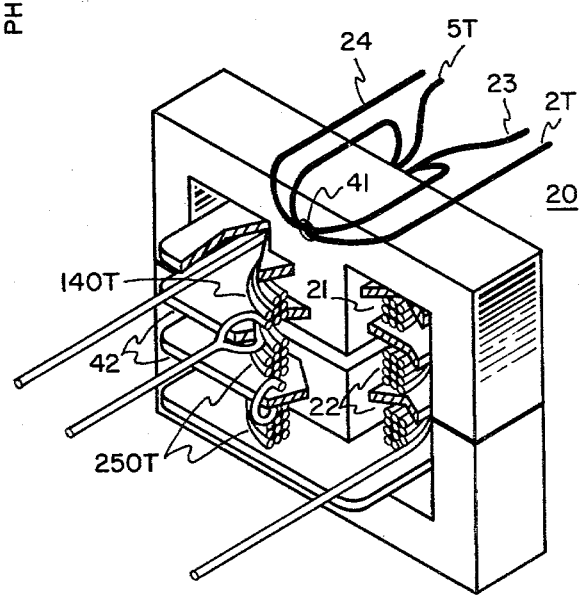

FIG. 4

LIGHTING UNIT

This is a continuation-in-part of co-pending U.S. patent application Ser. No. 47,972, filed June 13, 1979 now abandoned, entitled "Lighting Unit" by William Peil and Robert J. McFadyen.

RELATED APPLICATIONS

Application of Cap and Lake entitled "High Pressure Metal Vapor Discharge Lamps of Improved Efficacy", Ser. No. 912,628, filed June 5, 1978, now U.S. Pat. No. 4,161,672 (continuation-in-part of application Ser. No. 812,749 filed May 14, 1976, now abandoned).

Application of Schmitz entitled "An Inverter for Operating a Gaseous Discharge Lamp", Ser. No. 974,351, filed Dec. 29, 1978.

Application of Peil, entitled "Lighting Network including a Gas Discharge Lamp and Standby Lamp", Ser. No. 029,954, filed Apr. 13, 1979 (continuation-in-part of application Ser. No. 909,300, filed May 24, 1978, now abandoned).

Application of Harris, Schmitz, Peil and McFadyen, entitled "A Transformer for Use in a Static Inverter", Ser. No. 028,405, filed Apr. 9, 1979 (continuation-in-part of Ser. No. 875,337, filed Feb. 6, 1978, now abandoned).

Application of Peil and McFadyen, entitled "A Transformer for Use in a Static Inverter", Ser. No. 139,946, filed Apr. 16, 1980 (continuation-in-part of Ser. No. 969,381, filed Dec. 14, 1978, now abandoned).

Application of Hesler, Korzekwa and McFadyen, entitled "A Static Inverter Employing an Assymetrically Energized Inductor", Ser. No. 956,578, filed Nov. 1, 1978, now U.S. Pat. No. 4,202,031.

Application of Peil entitled "A Pulse Generator Producing Short Duration High Current Pulses for Application to a Low Impedance Load", Ser. No. 974,253, filed Dec. 29, 1978.

BACKGROUND OF THE INVENTION

1. Field of the Invention

The present invention deals with a lighting unit designed for functional similarity to an incandescent light source, and more particularly with a lighting unit in which the principal source of light is an arc discharge lamp supplemented by a standby filamentary light source, and which includes a compact "high frequency" power supply unit for supplying the needed energization from a conventional 110 volt 60 hertz source.

2. Background of the Invention

The present invention is an outgrowth of earlier efforts to produce an energy efficient and comparatively low cost replacement unit for the incandescent lamp. The incandescent lamp converts most of the electrical energy supplied into heat, a small percentage always less than 10% being converted into visible light. With the cost of energy rising, a need has arisen for a lighting unit which converts electrical energy into light with greater efficiency. Known lighting units such as fluorescent units have had double or triple the lighting efficiency of an incandescent light. A property of such devices, whih has limited their more general application, has been the high initial cost of the ballast for powering such devices and their elongated configuration. Another possible alternative has been the high pressure arc discharge lamp having up to six times the efficiency of an incandescent lamp. High pressure metal vapor ac discharge lamps have been available in high power units requiring costly power supplies, restricting their use to street lighting and commercial as opposed to home lighting. Recently, as disclosed in U.S. Pat. No. 4,161,672, smaller, low wattage, metal halide lamps having efficiencies approaching those of the larger size have been invented. Such lamps are a potential energy efficient replacement for the incandescent lamp provided that convenient low cost provisions can be made for standby illumination and for supplying the diverse electrical requirements for the two light sources.

A prior solution to the problem of a replacement unit for an incandescent lamp is contained in the U.S. application Ser. No. 29,954, filed Apr. 13, 1979 of William Peil, entitled "Lighting Network Including a Gas Discharge Lamp and Standby Lamp" and assigned to the Assignee of the present invention, that application being a continuation-in-part of an earlier application, Ser. No. 909,300, filed May 24, 1978.

The power supply of the present lighting unit represents an outgrowth of earlier high frequency power supplies in which a ferrite transformer, normally controlled or non-saturated operation and a transistor switch are the most significant elements. Such power supplies have been termed static inverters in deference to the fact that "dc" quantities are converted to ac through static or non-moving parts. Patents dealing with inverters of this class and ferrite transformers having the saturation avoidance feature include the U.S. Pat. Nos. 3,914,680, 4,002,390 and 4,004,251.

The U.S. application Ser. No. 974,253 deals with a power supply for supplying high voltage using ac harmonic ring-up of the inverter voltage.

The U.S. application Ser. No. 139,946 deals with a ferrite transformer having a saturation avoidance feature of the type herein employed.

The U.S. application Ser. No. 028,405 deals with a ferrite transformer having a modified construction, also having saturation avoidance features, which is of generally less convenience for the present application, but electrically similar.

The U.S. Pat. No. 4,202,031 deals with other static inverter configurations generally applicable to supplies producing high voltage energy.

In the general art of arc lamps and controls therefor, it has been suggested that a resistive incandescible filament be connected in series with an arc lamp to serve as a steady running ballast, the current causing the filament to incandesce. See, for example, Thouret U.S. Pat. No. 3,048,741. McLellan U.S. Pat. No. 4,100,462 shows such a steady-on filament in series with a fluorescent lamp. The steady-on series filament results in shorter total lamp life because a filament at incandescent temperatures has a limited number of operating hours, these being foreshortened by the high starting currents, as descried in the book "High Pressure Mercury Vapor Lamps and Their Applications" by Elenbaas, Philips Technical Library, 1965, in the first full paragraph on page 140. The steady-on filament further consumes significant power during the running of the arc lamp and precludes the realization of a very high efficiency (high lumens per watt) for the composite incandescent-/arc light source.

Further, it has been suggested that a resistive incandescible filament may be physically associated with an arc discharge lamp but selectively energized by controlled switching means so as to be excited when the arc lamp is in a starting and/or a failed mode. Examples of such prior art are Lake U.S. Pat. No. 3,527,982, McNamara U.S. Pat. No. 3,517,254, the copending application Ser. No. 29,954 identified above, and Haymaker et al U.S. Pat. No. 3,536,954. In those arrangements, however, (excepting Lake wherein part of the filament is shunted after arc starting) the filament serves no ballasting function, and the arc lamp must be ballasted by separate elements or controlled conduction devices. This leads to a greater number of parts, cost, complexity and volume for the control system as a whole.

Finally, in arc lamp systems involving no incandescible filament at all, it has been taught broadly to generate and apply high voltage starting energy to the arc lamp terminals, and then to turn off the starting energy in response to the establishment of the arc. Snyder U.S. Pat. No. RE. 29,204 and Elms U.S. Pat. No. 4,103,209 disclose such arrangements in control systems for energizing arc lamps from alternating electric power sources.

SUMMARY OF THE INVENTION

Accordingly, it is an object of the invention to provide an improved electrically energized light source.

It is a further object of the invention to provide an improved lighting unit utilizing an arc discharge lamp.

It is another object of the invention to provide an improved lighting unit wherein the main source of light is an arc discharge lamp supplemented by a filamentary light source controlled in an advantageous fashion.

It is a further object of the present invention to provide a lighting unit wherein the main source of light is an arc discharge lamp supplemented by a filamentary light source having an improved operating network to serve as an auxiliary light source under certain conditions and as a low wattage, non-incandescing ballast under other conditions.

It is a further object of the invention to provide a lighting unit combining a main arc discharge lamp with a standby filamentary lamp having an improved operating network providing arc lamp energization at an above audible frequency during starting and dc arc lamp energization during warm-up and normal lamp operation.

It is still another object of the invention to provide an improved lighting unit combining a high pressure metal vapor arc discharge lamp with a stand-by filamentary light source which provides an increased available power for the arc lamp during the glow to arc transition for more reliable starting.

It is yet another object of the invention to provide an improved lighting unit combining a main arc discharge lamp with a standby filamentary light source having improved immunity to line transients.

It is an additional object of the present invention to provide an improved lighting unit combining a main discharge lamp and a standby filamentary light source having an improved operating network for providing adaptive energization during starting of the main lamp and for providing substantially constant standby illumination prior to a proportional reduction in standby lighting as the main lamp approaches full light output.

It is another object of the present invention to provide an improved lighting unit combining a high pressure metal vapor discharge lamp with a standby filamentary light source having a compact power unit designed to permit mechanical and dimensional interchangeability of the unit with a conventional incandescent lamp.

These and other objects of the invention are achieved in a novel lighting unit utilizing an energy efficient metal vapor arc discharge lamp as the main source of light supplemented by a standby filamentary light source, the filament thereof serving as a resistive ballast for the discharge lamp. The filamentary ballast which has a low dissipation in relation to that of the arc lamp in the final run state of the arc lamp for efficient operation, does not reach a temperature accompanying useful light production that would shorten its life. The lighting unit also includes a dc power supply and an operating network for converting 120 V 60 hertz energy into the forms needed for operating the lamp and standby filament. The lamp and standby filament are contained in a single glass enclosure and the dc supply and operating network are contained in a small case to which the glass enclosure is attached and which has an "Edison" base for inserting the lighting unit into a conventional lamp socket. In short, the novel lighting unit is functionally similar to an incandescent lamp but produces light with a more efficient use of power.

The dc power supply of the lighting unit comprises a rectifier, preferably a bridge, for coverting ac to dc and a capacitor for reducing the ripple, smaller when a bridge is used.

The operating network of the lighting unit comprises the filamentary ballast mentioned above, which has a resistance exhibiting a substantial resistance increase with applied voltage, a transformer, a transistor switch, and means responsive to the electrical state of the lamp for maintaining the switch in one condition (off) during warm-up and normal operation of the lamp, and in a second condition (intermittent or astable operation), during other states of the lamp.

The elements of the operating network are interconnected with the dc supply for the supply of dc current to the resistive filament and the arc discharge lamp in series for energizing and ballasting the lamp when the switch is off. When the switch is intermittently operated, current is coupled in pulsating form to the input of the transformer for starting the lamp.

Sensors of both voltage and current conditions in the operating network, reflective of the state of the lamp, maintain the intermittent switching operation through pre-ignition, ignition and the glow to arc transition of the lamp. When thermionic emission (warm-up) occurs, intermittent switch operation terminates, and the dc current flow through the resistive filament and lamp starts.

The operating network maintains a substantially constant standby illumination through the starting procedure into early warm-up of the lamp and supplies the widely disparate requirement of the lamp from pre-ignition to final operation. The compactness of the unit arises through the use of above audible electrical frequencies, which permit efficient, and small ferrite transformers, the dual or two purpose function served by the resistive element, and the compactness of the efficient solid state circuit now to be further described.

Considering the circuit of the operating network more particularly, the resistive filament and the switch are serially connected across the dc supply. A first capacitor, the main primary winding of the transformer and the switch are serially connected across the dc supply. The first resistance element is also in parallel with the serially connected first capacitor and main primary winding. Intermittent operation of the switch provides a periodic (pulsating) current for standby illumination and a periodic (alternating) current in the transformer input for the lamp. The first capacitor prevents direct current flow in the transformer primary and reduces unnecessary dissipation.

The transformer has a second output winding connected at the other end through a second capacitor to the anode end through a second capacitor to the anode of the arc discharge lamp. A diode is poled to permit dc current flow from the dc supply through the filamentary resistance and into the lamp when the switch is off. When the switch is intermittently operated, the output circuit rectifies the transformed alternating output coupled to the lamp.

The main lamp responsive means includes main lamp current sensing, voltage sensing and a trigger oscillator responding to a difference in sensed quantities for controlling the switch. The sensing elements are a lamp current sensing resistance connected between the lamp cathode and the reference (−) terminal of the dc supply and a voltage divider connected between the winding interconnection and the dc reference terminal. The voltage appearing at this interconnection reflects the loading produced on the input circuit by the main lamp during intermittent operation of the switch and the lamp voltage when the switch is in the off state. The sensed voltages are then coupled respectively to the base and emitter electrodes of a junction transistor, which is connected in a relaxation oscillator configuration with a capacitor across the input junction. The period of the oscillator is a function of the sensed voltage difference which affects the charging rate of the capacitor. The relaxation oscillator generates a trigger pulse, peaked with the aid of transformer feedback, and turns on the solid state switch, also a junction transistor.

The transistor switch is turned on by a trigger pulse provided from the trigger oscillator and turns itself off after conducting for a fixed interval. Self turn-off is achieved by a pair of feedback windings coupled to the switching transistor which provide feedback which reverses from conduction aiding to conduction inhibiting when a predetermined flux level is achieved in the transformer core, the flux level being due to switch controlled current in a main transformer winding.

The trigger oscillator controls the transistor switch in response to the lamp conditions. When the lighting unit is first energized, the sensed lamp current is zero, the sensed voltage maximum and the trigger oscillator is turned on, causing intermittent switch operation. Intermittent switch operation continues until the lamp current reaches the larger initial value, corresponding to earlier warm-up, and the voltage at the winding interconnection plummets to the low voltage corresponding to early warm-up.

The switch is sustained in an off position from the warm-up to final run conditions so long as the current in the lamp does not fall below an arbitrary value substantially less than the normal range of operating current, and the voltage does not rise an arbitrary value above the normal voltage. Such a departure from normalcy may occur when the lamp responds to a transient low voltage line condition, and the trigger is restarted to prevent lamp extinction.

In addition to the foregoing means for establishing when the operating network should be in the dc state, the operating network has means for distinguishing between the pre-ignition period and the glow to arc transistion of the main lamp for further adaptive response to the dissimilar needs of the standby filament and the arc discharge lamp. The response of the operating network involves a change in the switching rate from 50 kHz during pre-ignition to 35 kHz during the glow to arc region. The higher rate establishes a higher average on time for the transistor switch, which sets the energization of the standby filament at a desired light output. During the glow to arc transition, the frequency is reduced to 35 kHz, which increases the off time of the switch during which power is transferred to the main lamp. The reduction in frequency substantially increases the available power to the main lamp with a minimum and short duration reduction in light output from the standby filament. This increased available power meets the needs of the high pressure metal vapor arc lamps, such as are referred to in said U.S. Pat. No. 4,161,672.

The term "arc lamp", "discharge lamp", or "arc discharge lamp" are used interchangeably in the present application to characterize a lamp in which a discharge occurs through an ionizable gas and in which a vaporizable metal and/or a vaporizable metal salt are also provided. As a class, the applicable lamps exhibit both a glow phase and an arc phase and the gas may be at either a low pressure or a high pressure. The higher pressure lamps are often described as having a constricted arc. The lamps which are of the high pressure variety require additional available power (over the low pressure variety) to make the transition from the glow to the arc phase. In addition, the GAT power tends to be greater relative to the run power in the smaller high pressure lamps. Accordingly, while the principal embodiment of the invention is addressed to the use of a miniature high pressure lamp containing mercury and a metal halide, the principles of the invention are applicable to the larger class of metal vapor arc discharge lamps.

BRIEF DESCRIPTION OF THE DRAWINGS

The novel and distinctive features of the invention are set forth in the claims appended to the present application. The invention itself, however, together with further objects and advantages thereof may best be understood by reference to the following description and accompanying drawings in which:

FIG. 3 is a table of the five states of the lighting unit in a normal lighting sequence listing the conditions of the arc discharge lamp and the standby filamentary lamp, and the corresponding energization requirements;

FIG. 4 is an illustration of a ferrite transformer forming a portion of the power supply unit.

DESCRIPTION OF PREFERRED EMBODIMENT

Figure 1:
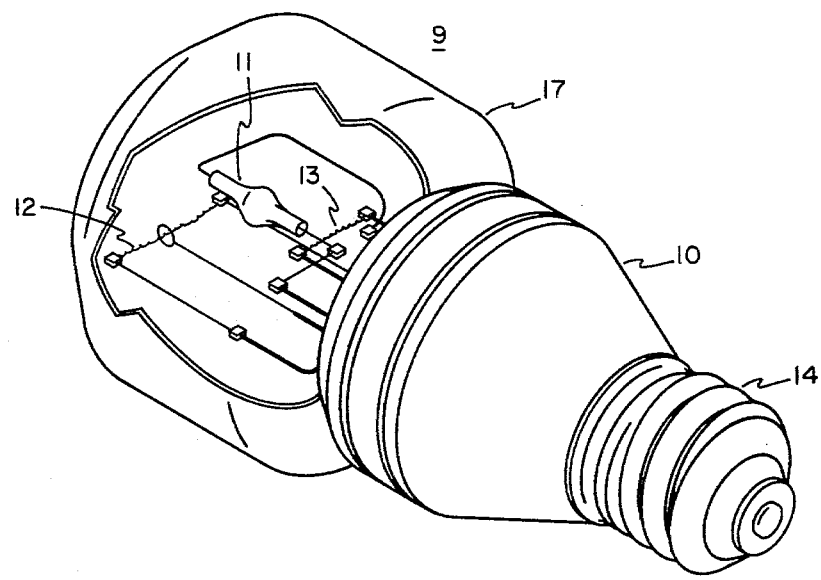
FIG. 1 is an illustration of a novel lighting unit suitable for connection to a standard lamp socket using an arc discharge lamp as the principal light source, a standby light source and a compact power supply unit.

Referring now to FIG. 1, a novel lighting unit for operating from a conventional low frequency (50–60 Hz) alternating current power source is shown. The lighting unit comprises a lamp assembly which produces light, and a power supply unit which supplies electrical power to the lamp assembly, with certain elements of the lighting unit having dual light production and ballasting functions. The lamp assembly includes a glass enclosure 9 which contains a high efficiency arc discharge lamp 11 and filamentary resistance elements 12 and 13. The resistance elements 12 and 13 are an electrical part of the power supply being used to ballast the arc discharge lamp, while the element 12 in particular is a functional part of the lamp assembly becoming a supplemental light source. The power supply unit includes a rigid case 10 attached to the glass enclosure 9 and a screw-in plug 14. The plug 14 provides both electrical connection and mechanical attachment of the lighting unit to a conventional ac lamp outlet. The unit developes the required energization for the arc discharge lamp during starting and operating conditions, including immunity to certain line transients, and produces instant illumination by use of the supplemental light source. The supplemental illumination is relatively constant during starting, tapering off as the arc lamp warms up.

The lighting unit provides an efficient and readily controlled light source which is economical in design and suited for household lighting. Efficiency in operation arises from the use of an arc discharge lamp as the principal source of light. The light output in lumens per unit of electrical power of an arc discharge lamp is the typically 4 to 6 times greater than that of an incandescent lamp. When electrically inefficient resistive ballasting is employed, as in the present unit, the efficiency is still comparable to that of a home fluorescent unit. By the selection of a minimum number of low cost, mass produced parts, the initial cost of the unit is comparable to a conventional fluorescent unit. When compared to an incandescent lamp, the savings in power during the lifetime of the new lighting unit more than compensates for the higher initial cost.

The novel lighting unit, as seen in FIG. 1 has the dimensional convenience of an incandescent lamp. The power supply unit occupies the space between the screw-in base 14 and the lamp assembly. In an incandescent lamp, this space corresponding to the neck of the lamp is normally allocated to the filament supporting structure. The glass enclosure 9 of the lamp assembly is approximately cylindrical. The lighting unit has approximately the same height and maximum diameter as an incandescent lamp. Light projection of the unit is over a solid angle slightly less than that of an incandescent lamp being reduced from a full sphere by the angle subtended by the power supply unit.

The lighting unit may be switched on, restarted, or turned off with the same convenience as an incandescent lamp and is insensitive to certain line transients normally effecting arc discharge lamps. The delays in production of light normally attendant upon the starting of an arc discharge lamp have been made less objectionable by the use of the supplemental incandescent element 12, packaged within the enclosure 9. In all stages of lamp operation, the light produced by the lamp assembly will appear to originate from the same approximate location and will retain approximately the same intensity and color balance. This feature is of particular interest for the half minute periods that it may take for the arc discharge lamp to reach full brightness after a cold start or the longer periods required for a hot restart. Finally, the power supply contains a line transient protection circuit. Should the line voltage be temporarily depressed, as by the starting of an electric motor also connected to the line, the supply will deliver energy to the gas discharge lamp in a form sufficient to maintain ionization until the transient is over. If the transient is long enough to cause cooling below thermionic temperatures, then a hot restart may be required.

The disposition of the elements of the lamp assembly are best seen in FIG. 1. The arc discharge lamp 11, the 60 watt filamentary resistance 12, and the 40 watt filamentary resistance 13, are all installed inside the single large glass envelope 9. The elements 11 through 13 are supported on leads sealed into the base of the lamp assembly. The gas filling the envelope 9 is an inert gas suitable for a conventional incandescent lamp. The discharge lamp 11 is shown with the positive electrode or anode down (near to the base) and the negative electrode or cathode up (remote from the base). The two electrodes are in turn sealed into the ends of a small quartz vessel whose outer contour is cylindrical except for a small central region of larger cross section, of less than $\frac{1}{2}''$ in diameter. The interior of the arc lamp, which is not specifically illustrated, contains a spherical or elliptical central chamber filled with an ionizable mixture: argon, an ionizable starting gas, mercury, which is vaporized when hot, and a vaporizable metal salt such as sodium and scandium iodides. When operating an arc is formed between the electrodes which creates illumination throughout the chamber. Small, low power lamps of the type just described are referred to as metal halide or metal vapor lamps. A suitable lamp is more fully described in the earlier cited U.S. Pat. No. 4,161,672.

Light production is shared between the discharge lamp 11 and the filamentary resistance 12, while the latter and the filamentary resistance 13 provide resistive ballasting for the arc discharge lamp. In normal "final run" operation, the filamentary resistance 12 (and 13 if dimmed) conduct the current flowing in the discharge lamp but primary light generation occurs in the discharge lamp. In starting or restarting and warm-up of the main discharge lamp, the filamentary resistance (12 primarily) produce supplemental illumination. In dimmed operation, the current levels and therefore the brightness of the discharge lamp is reduced by the imposition of resistance 13 in the current path.

A further feature of the lighting unit is the protection against accidental ultraviolet emission. The discharge is normally productive of substantial quantities of ultraviolet illumination. Since the electrode temperatures in the discharge lamp must be quite high, the enclosure must be of quartz. Quartz permits higher temperature operation but also transmits ultraviolet. Ultraviolet emission is then prevented by the use of a glass enclosure which is absorptive of ultraviolet. In the event that the glass enclosure is fractured, the possibility for continued operation of the discharge lamp and continued radiation of ultraviolet is precluded by the serial connection of the arc discharge lamp with the resistive filaments 12 and 13. The filaments are operated at sufficiently high temperatures during lamp operation that any destruction of the protective atmosphere as by a fracture of the glass enclosures destroys the filaments, preventing further lamp operation. Thus, the user is protected from ultraviolet emission in the case of fracture of the glass shielding by a nearly instantaneous extinction of the main lamp.

The arc discharge lamp exhibits several distinct states in conventional use and each active state requires distinct energization. From a practical viewpoint, the arc discharge lamp has three essentially active states denominated Phases I–III and an inactive state.

In Phase I, "ignition" occurs. The duration of ignition is normally no longer than a second or two and often much shorter. It is the time required for a suitably high voltage to cause "electrical breakdown" of the gas contained in the arc discharge lamp to initiate a falling maximum lamp voltage. This latter condition is also referred to as the establishment of a "glow discharge". For purposes of definition, ignition is to be distinguished from pre-ignition. Pre-ignition is an interval preceding ignition, whose duration is predictable for a given discharge lamp and power supply unit, and is the period during which ignition is improbable, normally due to non-optimum physical conditions in the lamp. Pre-ignition will be discussed below.

The ignition period consists of a delay period constituting most of the ignition period, distinguishable in principle from the pre-ignition period, and the much shorter microsecond-millisecond duration rise time associated with the initial discharge. The ignition delay assumes that the lamp is at standard ambient conditions, and is a period having a statistical average value, which by design is no longer than a second or two. The ignition delay is partly attributable to the random, isolated, natural creation of ions which instantaneously reduce the potential of the discharge, and is partly attributable to the nature of the ignition voltage. Should the ignition potentials be sustained, a lower ignition delay is predicted than for pulsed ignition, and a lower voltage may be used. When the ignition voltage is pulsed, a coincidence between the applied voltage and random spontaneous ionizations will define the ignition instant. The probable time delay for such a coincidence will increase as the duration of the ignition pulse shortens.

As indicated above, the ignition delay should be less than a second or two for practical certainty in starting. An increase in the ignition potentials, or an increase in the duration of the ignition pulse will shorten the ignition delay. In the event that minimum voltage and minimum duration ignition pulses are desired, irradiation of the arc discharge lamp by heat and light from a second light source can produce a drop of several hundred volts in the required voltage and facilitate the substitution of ignition pulses of a microsecond duration for a more sustained dc potential.

The rise time of the discharge is the short terminal portion of ignition. The arc discharge lamp will break down at the 1000-2000 volt ignition voltage, causing a sudden drop in lamp voltage to typically 15 volts and then the lamp may re-fire a second time, generally at a lesser voltage as the ionization level of the contained gases increases and entrance is made to the "glow to arc transition". In Phase I, lamps of the design herein contemplated require 1000 to 2000 volts using pulses of microsecond duration for ignition. The power required for the ignition period is small.

Phase II—the glow to arc transition—extends from one-tenth of a second to perhaps four seconds and is characterized by a more sustained ionization level and a lower maximum voltage. As Phase II begins, the discharge is typically unstable, swinging between a maximum and a minimum value, with the voltage of the discharge falling continually toward a lower maximum with a recurring minimum near 15 volts. As the average level of gas conduction increases, the maximum lamp voltage falls, the consumed power increases, and the temperatures inside the lamp also increase. As the maximum arc voltage falls through values near 150-500 volts, a more substantial energy (typically 2-8 watts) is required by a metal vapor lamp.

In certain lamp designs, the voltage during phase II may fall precipitously and then remain at 15 volts for virtually the entire phase, the same voltage continuing as the lamp transitions to thermionic emission (phase III). The two states can be distinguished by electronic "noise" observable by an oscilloscope which is present during phase II and absent during phase III.

Phase III begins with the establishment of the "arc" which occurs when a portion of the cathode has reached thermionic emission temperature. At the (usually) marked transition from phase II to phase III, the voltage of the discharge loses its unstable quality and holds to an initial value of about 15 volts. In phase III, a sustained low lamp impedance is exhibited, which is resistive short term positive (microseconds) and long term (milliseconds) negative. A current limiting ballast is required to prevent excessive heating and destruction. At the beginning of phase III, the lamp dissipation is set to be between 10 and 15 watts and significant light production starts.

The warm-up period, which is the initial portion of Phase III, normally lasts from 30-90 seconds. During the warm-up period, the lamp reaches full operating temperatures and the contained gases reach their high, final operating pressures. The voltage across the lamp increases to a value of typically 87 volts with an accompanying reduction in lamp conductance. When the final run condition occurs, the lamp absorbs maximum power (typically 32 watts) and the maximum light output is produced.

The pre-ignition period is a variable period having a nominal minimum value of zero at standing ambient conditions and a maximum value between 45 seconds and 4 minutes if there has been a failure of the arc and a hot restart is required. If the lamp is de-energized in the course of normal operation, the lamp will be at an elevated temperature and at a high gas pressure for a short while. To restrike the arc when the lamp is hot, the potential required may be in excess of an order of magnitude more than for a cold start (e.g., 10-30 KV). The thermal time constants of the lamp are such that the time required for cooling from a hot operating condition to the point where a conventional (1-6 KV) voltage will restrike an arc may be from 45 seconds to 4 minutes.

Supplemental illumination is particularly important to the user during warm-up and the pre-ignition period for a hot restart. Assuming a normal cold start, pre-ignition and ignition last for a second or two and because the arc discharge lamp is producing negligible light, standby illumination is desirable. The glow to arc transition period approaches four seconds and supplemental illumination is desirable for the same reason. During warm-up, which lasts from 30-90 seconds, the light output of the discharge lamp increases from a very low to the normal value and supplemental illumination, preferably modulated in an inverse sense, is essential. In the final run condition, no supplemental illumination is provided. Should a hot restart be required, the period required for restoration of an arc may take up to 4 minutes, and supplemental illumination is also essential. While standby illumination is particularly needed during warm-up and "hot restart", smoothness in illumination throughout the starting or restarting procedure is also desirable, and the standby illumination is adjusted for approximate constancy from pre-ignition to early warm-up.

Figure 2:
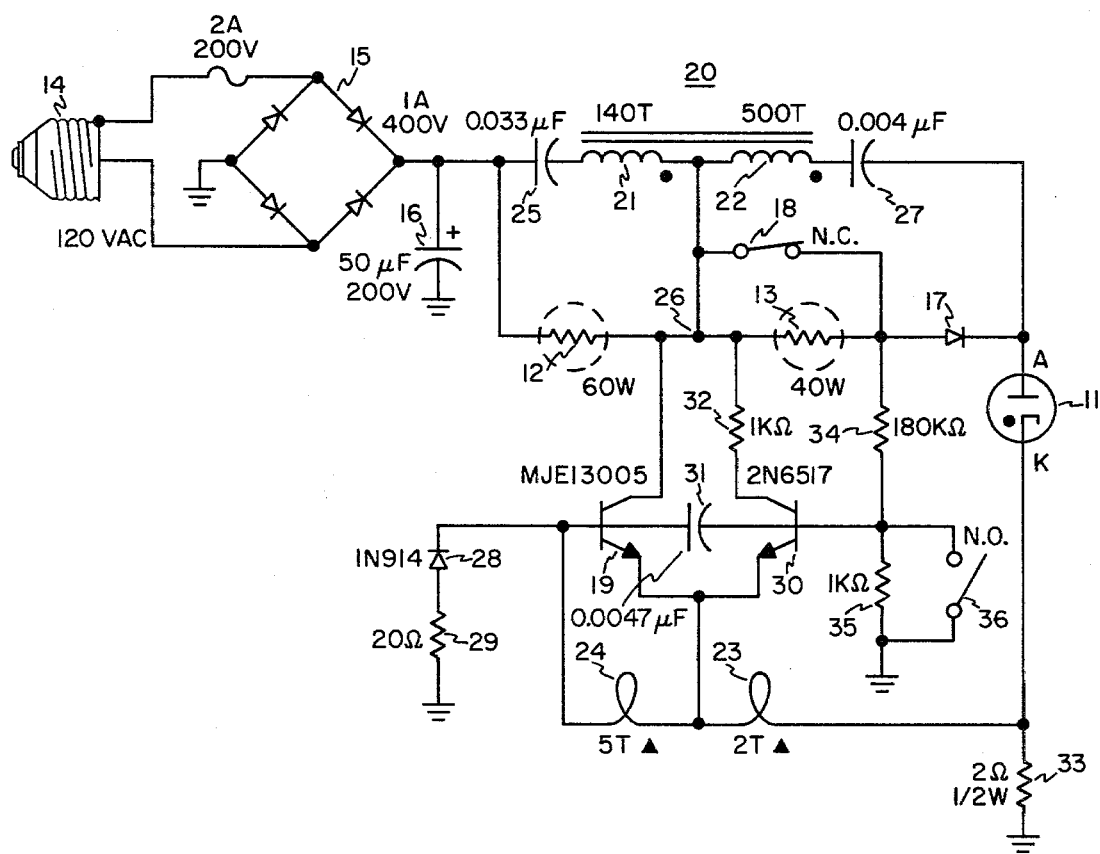
FIG. 2 is an electrical circuit diagram of the lighting unit.

Suitable operating power for the arc discharge lamp and the standby light producing filament is provided by the power supply illustrated in FIG. 2. When the discharge lamp is in the final run condition, the power supply provides dc energy at approximately 145 volts with resistive ballasting. The ballasting reduces the voltage at the lamp to 87 volts, and sets the arc lamp operating power at 32 watts. During this period current is flowing through the filament 12, acting as a ballast, sufficient to hold it at an elevated temperature but insufficient to produce useful light in the filament.

In pre-ignition and ignition, the power supply produces a succession of high frequency unidirectional pulses with a high frequency alternating component. The unidirectional pulses, which initially occur at a 50 kHz repetition rate, provide substantially full power to the filamentary resistance, so that it provides a preselected level (e.g. 800 lumens) of incandecent light. At the same time the alternating component, transformed and rectified, is applied to the arc discharge lamp for ignition. This results in a dc restored waveform having a peak amplitude of about 1600 volts with reference to ground and at a low power level.

In the glow to arc transition, high frequency pulses for full power standby illumination continue, while the high frequency power available for the arc discharge lamp, as it crosses through a 200–400 volts maximum, is increased to 9 watts. This increase in available power is achieved by a lamp condition responsive reduction to 35 kHz in the pulse repetition rate. The increase in available power insures a reliable transition of the high pressure metal vapor lamp to warm-up operation.

When warm-up occurs, high frequency operation of the power supply unit ends and the power supply now produces a dc output, subject to 120 Hz ripple. This dc output is applied to the arc discharge lamp and the filamentary resistance in series, the resistance now serving as a low dissipation ballast producing no useful output. The role of the filamentary resistance at the beginning of warm-up is a joint one, producing a full light output while also ballasting the arc discharge lamp. Ballasting holds the initial dissipation in the arc discharge lamp to about 12 watts as the arc voltage falls to about 15 volts. As warm-up continues, the light produced by the filamentary resistance falls to a negligible value as the light produced by the arc lamp increases. The brightness of the filament during hot restart, ignition, glow to arc transition and initial warm-up are preferably set to approximately the same value. This has the subjective advantage of preventing sudden changes in brightness of the lighting unit during starting or restarting.

The lighting unit whose electrical circuit diagram is illustrated in FIG. 2 has as its principal components the arc discharge lamp 11, a dc power supply (14, 15, 16) for converting the 120 volt 60 Hz to dc, an operating network (17-36) for converting electrical energy supplied by the dc power supply into the forms required for operation of the lamp assembly and finally two filamentary resistances (12 and 13) which perform a ballasting function in the operating network, and one (12) of which enters into the production of standby light. The lighting unit has five active conditions characterized by the states of the discharge lamp, the standby light source, and the operating network. These states, which summarize the preceding discussion, are illustrated in FIG. 3.

The dc power supply circuit of the lighting units is conventional. Energy is supplied from a 120 volt 60 hertz ac source via the plug 14 and two input connections to the ac input terminals of a full wave rectifier bridge 15. The positive output terminal of the bridge becomes the positive output terminal of the dc supply and the negative output terminal of the bridge becomes the common or reference output terminal of the dc supply. The filter capacitor 16 is connected across the output terminals of the dc supply to reduce ac ripple. The output of the dc supply during normal run operation of the arc discharge lamp 11 is 145 volts at about $\frac{1}{3}$ amperes current, producing an output power of approximately 50 watts of which 32 watts is expended in the lamp. The power required of the dc power supply by the lighting unit during a hot restart is approximately 60 watts and the maximum required during warm-up of the arc discharge lamp is approximately 75 watts.

The operating network which derives its power from the dc supply, and in turn supplies energy to the lamp assembly, comprises the elements 17-35 (optionally 12 and 13) connected together as follows: The filamentary resistance 12 and 13, diode 17, arc discharge lamp 11 and lamp current sensing resistance 33 are serially connected in the order recited between the positive terminal and the common terminal of the dc supply. A switch 18 shunts the filamentary resistance 13 producing dimming of the discharge lamp when open and undimmed operation when closed. The diode 17, which is poled for easy current flow from the dc source to the discharge lamp, has its anode coupled to one terminal of the resistance 13 and its cathode coupled to one terminal of the gas discharge lamp 11. The discharge lamp, which has a required polarization, has its anode coupled to the cathode of the diode 17 and its cathode coupled to one terminal of the current sensing resistance 33.

Continuing with a description of the operating network, a triggered monostable solid state switch is provided, constituted of a power transistor 19, a step-up transformer 20, and passive components 28, 29. The power transistor has base, emitter and collector electrodes. The step-up transformer 20 has a ferrite core for high frequency operation (>20 kHz), a main primary winding 21, a main second winding 22, a primary control winding 23 and a secondary control winding 24, all associated with the core. The control windings, as will be described, provide a transistor conduction control whose sense is responsive to the magnetic state of the ferrite core and produce monostable action, avoiding full core saturation. The main primary winding 21 has its undotted terminal coupled through the capacitor 25 to the positive source terminal and its dotted terminal connected to the interconnection terminal 26 between filamentary resistances 12 and 13. The main second winding of transformer 22 has its undotted terminal connected to the terminal 26, and its dotted terminal connected through the capacitor 27 to the anode of the discharge lamp 11. The emitter of the switching transistor 19 is coupled to the unmarked terminal of the primary control winding 23. The marked terminal of the primary control winding 23 is connected to the cathode of the arc discharge lamp 11. The base of transistor 19 is coupled to the cathode of a clamping diode 28, whose anode is coupled through resistance 29 to the common dc terminal. The secondary control winding 24 has its unmarked terminal coupled to the base of transistor 19 and its marked terminal connected to the emitter. The base of transistor 19 is the point for application of a trigger pulse for initiating each conduction cycle.

The operating network is completed by the transistor 30 which, with its associated components, forms a triggering oscillator for recurrently turning on the solid state switching transistor 19. The trigger oscillator is turned on and off and also shifted in frequency in response to electrical conditions attributable to the electrical state of the arc discharge lamp. The transistor 30 has its emitter coupled to the emitter of transistor 19, its base coupled through the capacitor 31 to the base of transistor 19, and its collector connected through the resistance 32 to the interconnection terminal 26. A voltage sensing voltage divider is provided consisting of resistance 34 connected between the anode of diode 17 and the base of transistor 30 and resistance 35 connected between the base of transistor 30 and the common source terminal. During warm-up and final run operation, both dc states of the lighting unit, the diode 17 is forward biased, and the divider output voltage, at the base of transistor 30, is proportional to the lamp voltage. During the high frequency states of the lighting unit, the diode 17 is reversely biased and non-conductive during those high frequency half-cycles when current is delivered to the lamp, so that the voltage on the voltage divider reflects the loading effect of the arc discharge lamp upon the transformer circuit and is an indirect measure of the lamp voltage. The connection of the emitter of transistor 30 to the non-referenced terminal of the resistor 33 in series with the gas discharge lamp 11, makes the trigger oscillator responsive to lamp current in the form of the voltage proportional to lamp current developed in resistance 33. The trigger oscillator is connected to respond in the manner noted above to the difference in those two sensed voltages. A position sensitive switch 36 is provided connected in shunt with the resistance 35 for preventing operation of the lamp unless it is in a vertical base down position.

The operating network, as earlier indicated, supplies the complex energy requirements of the lighting unit. The operating network acts in response to the second state of the main arc discharge lamp and assumes the states summarized in the chart of FIG. 3. The chart is not complete in that it does not specifically include dimmed operation of the lamp, nor "transient catch" operation. The final run state of the operating network will be taken up initially.

In the final run state of the lighting unit, the operating network provides direct current energization of the arc discharge lamp with resistive ballasting; permits dimming of the arc discharge lamp by user choice; and monitors the current and voltage of the arc discharge lamp to sense signs of incipient failure of the arc. The dc supply voltage has 15%–20% of 120 Hz ripple. During final run operation (with the lamp undimmed), the voltage of the arc is 87 volts with 32 watts being dissipated in the arc lamp and 18 watts being dissipated primarily in the filamentary resistance 12. The light output is 2200 lumens, approximately that produced by a 150 watt three way incandescent lamp. In the undimmed mode, the current for arc discharge lamp supplied by the 145 volt dc source (14, 15, 16), flows through a serial path including the filamentary resistance 12, the closed dimming switch 18, the diode 17, the lamp 11 itself and current sensing resistance 33.

The operating point of the lamp is established in the final run state at an approximate current of about one-third ampere, a voltage of about 87 volts, and a power of 32 watts as mentioned above. These settings are determined primarily by the ballasting resistance 12, the properties of the arc discharge lamp and the output voltage of the dc supply. They are chosen such that the final running current leaves dissipation wattage in resistance 12 less than in the arc lamp and too low to generate useful light. The diode 17 and small (2Ω) resistance 33, which are the other serially connected elements in the circuit, have a negligible effect upon the current and may dissipate a fraction of a watt.

The lamp exhibits a negative resistance characteristic normally less than 20 ohms in the final run state. Thus, it will tend to reach too high a dissipation if the current is not properly limited. Excessive lamp dissipation is prevented by selecting a ballasting resistance having a sufficiently large value. The filamentary ballast resistance 12 has a value of 15 ohms when cold and approximately 150 ohms when at the temperature produced by normal lamp operating currents. The 150 ohm ballasting resistance establishes an operating point which is stable, preventing excessive lamp dissipation over normal ranges of supply voltage.

Line voltage variation, which affects the dc supply voltage, presents the primary danger of accidental dropout of the arc lamp. Excessive line voltage, if of a long term nature, may cause heating, which is normally not serious, but reduced line voltage, particularly short term, may extinguish the arc. Under operating conditions, the dc supply provides a dc output voltage with a 15% to 20% ripple. This produces a roughly 50% ripple in the lamp current and an opposite 8% to 10% variation in ac lamp voltage. Under these conditions, the power dissipation may fluctuate on an instantaneous basis, but if the average is appropriate, the instantaneous variation is of little consequence. Should the ac line voltage drop 20% and the "low peaks" of the pulsations in the dc lamp voltage climb 10%, an instant may occur at which the lamp arc may require more voltage than is available from the supply, and the lamp will go out. When the ac waveform of the line voltage contains a 120 cycle ac ripple, the supply voltage minima are sharp dips and the maxima are smooth. The corresponding curve representing the voltage demanded by the lamp contains sharp upward peaks with gradual slopes before and after the peaks. The peaks are delayed with respect to the minima of the supply voltage for a small fraction of the 120 Hz cycle. The curves of the dipping ac supply voltage and the rising ac lamp requirement may cross through a common value and yet not coincide at the same instant in time, a condition which would force lamp extinction. Should the line voltage fall a further 20% for a few cycles due to a transient load condition on the line, then the curves may be expected to intersect even though minima and maxima are mutually displaced. Should an intersection occur, the arc will be momentarily extinguished, and if not restruck before de-ionization takes place, the discharge lamp will go out. This possibility is reduced by the transient catch circuit, which re-ignites the lamp before de-ionization has occurred. The transient catch circuit, which will be taken up subsequently, must be set to respond to both a dip in lamp current, typically to 50 milliamperes and an elevation in lamp voltage of 10 volts, both conditions being present when the lamp is near extinction.

The sensitivity of the circuit to drop out may be reduced by increasing the size of the filter capacitor 16. The present capacitor size (50 μfd) is dictated in part by economic considerations and in part by the need for a small total size. In the event that these considerations are unimportant, some increase in capacity may be desirable. An increase of more than a factor of 10 is normally not indicated in view of the stresses that are placed on the input side of the circuit.

The ballasting resistance (12) is held at a sufficiently high temperature to produce a glow, which in the event of perforation of the envelope produces destruction of the filament and a discontinuance of the current to the arc discharge lamp, thus protecting the user from UV radiation as earlier noted. In the dimmed mode, the switch 18 is open and the filamentary resistance 13 becomes a part of the principal current path. In the dimmed mode, the current setting of the gas discharge lamp is reduced from 0.37 A to 0.22 A by the effect of the additional series resistance and the light output falls by a factor of approximately three. In the dimmed mode, the current levels are sufficiently high to cause destruction of one of the filamentary resistances in the event of damage to the glass envelope and energization of the arc lamp is also stopped.

Warm-up conditions of the arc discharge lamp mark a distinct break with the preceding Phase II, but a gradual transition into final run conditions. In Phase II, (i.e., the glow to arc transition), ionization has been established but the average current, dissipation and light output of the lamp are low and the discharge unstable. With the beginning of warm-up, the discharge stabilizes, bringing about an increase in average ac lamp current, dissipation and light output. The transition to the final run condition is smooth with the voltage gradually increasing from about 15 volts to the 87 volt final voltage, the power dissipation in the lamp gradually increasing from 12 to 32 watts and the light output, initially low, gradually increasing to the final value. Within the lamp during warm-up, the electrodes, the envelope and the contained gas reach the final operating temperatures and the gas pressure increases to the final value. Warm-up typically lasts from 30 to 45 seconds.

In the warm-up mode, the operating network produces a dc output subject to substantial (120 Hz) ripple, at an initially high, but moderating power. The dc electrical output to the arc lamp during warm-up represents a sharp change from the high frequency output applied to the lamp in the glow to arc transition, but the change from warm-up to the final run output, both dc outputs, is gradual. The electrical circuitry applicable to warm-up is the same as that discussed in connection with final run, with the changes in electrical energization and standby illumination being a smooth response of the operating network to electrical changes in the lamp.

During warm-up, the operating network goes through gradual electrical change in response to current in the main lamp. Excessive dissipation in the main lamp is prevented and the standby illumination is transitioned from a maximum to a minimum lumens output as the main lamp illumination increases from a low to its final high value. At the onset of warm-up, the gas discharge has stabilized at a low voltage and the lamp current tends to increase. The serially connected filament 12 is already in an elevated resistance state, the positive temperature coefficient resistor having been heated previously during the glow to arc transition. The large serially connected filamentary resistance prevents the initial dc arc current from exceeding a pre-determined value (6/10th of an ampere) and the initial main lamp dissipation from exceeding 12 watts. At the same time, the dissipation in the filamentary resistance is initially approximately 63 watts and a maximum power of 75 watts is required from the dc power supply. The initial conditions produce approximately 800 lumens of light in the standby filament, and as will be shown, continue the level of standby illumination at approximately the same level as during Phases I and II. As warm-up continues, the voltage in the main lamp climbs, the current falls, and the dissipation climbs. In the filamentary resistance, the initial dissipation of 63 watts falls with the fall of current in the main lamp and gradually reduces to 18 watts. The initial standby light output of 800 lumens gradually diminishes to the negligible output produced at the 18 watt dissipation level in final run.

The filamentary resistance 12 thus establishes the maximum dissipation during warm-up and coacts with the arc lamp to produce the desired inverse or complemental change in standby illumination. It also sets the desired final run dissipation of the main arc discharge lamp. A filamentary resistance whose value is approximately 150 ohms when hot (15 ohms cold) provides the foregoing essential settings.

In pre-ignition, ignition and glow to arc transition, the transformer 20, the transistor switch 19 and the trigger oscillator (30, etc.) of the operating network assume an active role generating a high frequency output. This is in contrast to the passive role played during warm-up and final run when the energization produced is primarily dc. The sharp change in high frequency electrical output occurring between the glow to arc transition and warm-up is in response to conditions in the main lamp. The changes in electrical output of the operating network between pre-ignition and ignition and between ignition and the glow to arc transition are gradual, and are also in response to conditions in the main lamp.

In pre-ignition, ignition and the glow to arc transition, the operating network produces high voltage, high frequency energy for ignition of the arc discharge lamp, the voltage falling to a lower value in response to lamp loading in the glow to arc transition. During pre-ignition, the unidirectional high voltage energy contains pulses which occur at a rate of 50 kHz with substantial ringing at a frequency in the range of 400 kHz. The waveform, and the peak voltage, are determined by transformer stray capacitance and leakage inductance. In the glow to arc transition, the ringing is reduced and the pulse frequency shifts to 35 kHz. The downward shift in frequency produces a lower conduction duty cycle in the transistor 19, which increases the energy supplied to the lamp in the glow to arc transition. The operating network also supplies enough current to the filamentary resistance 12 to produce approximately 800 lumens of standby illumination through pre-ignition, ignition and glow to arc transition. The filamentary energization is primarily a series of unidirectional pulses at the 50-35 kHz rate.

The operating network produces the high frequency electrical energization described above as a result of high frequency switching of the monostable transistor switch. Intermittent switching of the transistor switch produces ringing and an alternating current component in the main primary winding 21 of the step up transformer 20, a stepped up alternating component in transformer output and a pulsating current in the filamentary resistance 12 which is primarily unidirectional.

Alternating current flow in the main primary winding takes place in the following manner. Assuming that the transistor 19 has been turned on by a suitable trigger signal coupled to its input junction, a displacement current path is completed between the positive and common terminals of the dc supply. That path comprises in order the capacitor 25, the main primary winding 21, the NPN switching transistor 19 (collector and emitter electrodes, respectively), the primary feedback winding 23 and the current sensing resistance 33. The switching transistor presents a low impedance when conducting, and the capacitor 25, the primary feedback winding 23 and the resistance 33 are also low impedances. As the current in the circuit increases, the primary feedback winding 23, which is inductively coupled to the secondary feedback winding 24, produces regenerative feedback in the input circuit of the transistor and turns it on more strongly. Accordingly, when the transistor conducts, the current rapidly builds up in the transformer primary winding, limited primarily by the primary inductance. The current build up continues, however, until a prescribed flux level is reached in the core of the power transformer. At that point, by a mechanism which will subsequently be explained, feedback is inverted to become degenerative, turning off the transistor 19 before full core saturation is reached. The discontinuance of conduction through transistor 19 opens the prior path for current flow through the primary winding and the now-charged capacitor 25 may discharge and resonate with the inductance of the winding 21. A portion of the energy stored in the circuit dissipates in the form of a reverse current through the filamentary resistance 12. Thus, the current flow, which was initially out of the dotted terminal of the primary winding when transistor 19 was conducting, reverses and the current now flows from capacitor 25 via filament 12 into the dotted terminal.

The transformed version of the high frequency alternating voltage appearing across the transformer primary winding during pre-ignition, ignition, and the glow to arc transition appears at the terminal of the winding 22, remote from winding 21. The output is coupled from winding 22 by means of the capacitor 27 to the anode of the discharge lamp 11. The output takes the form of unidirectional pulse-like energy by virtue of the presence of the diode 17 whose anode is coupled through filamentary resistance 13 (or the closed switch 18) to the undotted terminal of the second winding and whose cathode is coupled to the anode of the arc discharge lamp. The diode 17 is poled to permit application of a stepped-up output voltage to the arc discharge lamp developed during the reverse current flow in the transformer primary circuit and to suppress application of the output voltage developed during forward current flow when the switching transistor is conducting. With the indicated parameters, and assuming substantial ringing, the available preignition potential is the 1600 volts peak to peak referred to earlier. Pre-ignition time is nominally zero when the lamp is cold and from 45 seconds to 4 minutes when the lamp is hot.

The transformer 20 is essentially an auto-transformer although in certain respects it may be regarded as a conventional transformer with separate primary and secondary windings. The windings 21 and 22 are serially connected, and wound in the same sense and the input is applied across the primary winding 21. When transistor 19 is conductive and its current is increasing, the common terminal (point 26) between the primary and secondary windings may be viewed as residing at reference potential and the voltage developed in the secondary winding reflects the primary to secondary turns ratio 140/500 with the diode 17 providing a short circuit and precluding the application of an output voltage to the arc lamp. Conduction by the diode 17 decreases as the capacitor 27 becomes charged by forward diode current; and when the polarity of the voltage induced in secondary winding 22 reverses to make the dotted terminal positive relative to point 26, the voltage on capacitor 27 is in series aiding to the secondary winding voltage, and this combined voltage is applied across the arc lamp electrodes. When the transistor 19 is nonconductive or its current is decreasing, stored energy developed across winding 21 and in the capacitor 25 is released, and the device appears as an auto-transformer with the transformer ratio being 140/640. Thus, during the critical period when the transformer is delivering energy to the arc discharge lamp, the transformer is in an auto-transformer configuration.

The current for standby illumination during pre-ignition, ignition, and the glow to arc transition is also produced by high frequency switching of the transistor switch. At the instant that the transistor switch becomes conductive, a direct current path is completed between the positive and common terminals of the dc supply. The dc path includes the standby light producing filamentary resistance 12, the transistor 19 (collector and emitter electrodes, respectively), the primary feedback winding 23 and the current sensing resistance 33. The transistor 19 presents a low impedance, when conducting, and the primary feedback winding 23 and the resistance 33 are also low impedances. At the start of pre-ignition, the resistance of the filamentary resistance may also be low, and a large initial current ensues. Self-heating is rapid, and the resistance quickly reaches a relatively stable, larger value near 150 ohms, which persists throughout the balance of the starting procedure. The heat dissipation—and thus output lumens—in the filamentary resistance during preignition is set primarily by its own relatively large resistance, the duty cycle of the transistor switch and the dc voltage available from the dc power supply, and may be increased by adjustment of these parameters.

In addition to the intermittent current supplied to the filamentary resistance in the dc path just described, the return portion of the alternating current flowing in the primary winding 21 of the transformer also flows through the filamentary resistance as discussed earlier. During pre-ignition, with the secondary winding of the transformer 20 working into the lamp 11, which at this time appears as an almost infinite resistance, very little reverse current actually flows (from right to left) in the primary winding 21. Thus, the heating effect of the reverse current in the filament 12 in the primary circuit is negligible. During the glow to arc transition, when the lamp draws the more substantial energy, the alternating current adds significantly to the total dissipation in the filament, while the pulsating dc energization of the filament, due to conduction by transistor 19 with a lower duty cycle, is reduced. The glow to arc transition is of a sufficiently short duration to neglect this momentary variation in filamentary dissipation, and the standby light output appears to transition smoothly into the dc warm-up period.

The operating network is responsive to the electrical state of the arc discharge lamp to produce the outputs previously characterized during pre-ignition. ignition and the GAT period. The means by which this responsiveness is accomplished includes the triggering oscillator (transistor 30, etc.), lamp current sensing resistor 33 and the voltage sensing resistors 34, 35.

The trigger oscillator causes active operation of the transistor switch 19 during pre-ignition, ignition and the GAT period and controls the transistor duty cycle to supply additional energy to the arc discharge lamp during the GAT period. Since the transistor switch is monostable, each trigger pulse supplied from the trigger oscillator initiates a conduction sequence.

The trigger oscillator is normally activated at the time the operating network is first energized, and remains energized through the pre-ignition, ignition and glow to arc transition. During pre-ignition, there is no lamp current, while during ignition and the glow to arc transition, the lamp current increases to one-fifth of an ampere peak in short pulses. The peak voltage developed in the transformer primary winding—due to flyback and resonance—and appearing at point 26 is high (>300 V) during pre-ignition, falls appreciably under the loading effect of the lamp during ignition, and the glow to arc transition, and consists of a series of pulses initially with substantial ringing.

The foregoing current and voltage conditions reflecting the lamp condition during pre-ignition, ignition and glow to arc transition are sensed in the operating network and combined differentially at the input junction of the oscillator transistor, and used to activate the trigger oscillator. Any lamp current flowing in the lamp current sensing resistance 33, to which the emitter electrode of the transistor 30 is coupled via the low impedance feedback winding 23, produces a voltage in a sense tending to back-bias the base-emitter junction. (The lamp current is zero at the start and remains small during these lamp conditions.) The voltage at the interconnection point 26 is applied across the voltage divider 34, 35, the output tap of which is coupled to the base electrode of the transistor 30. The voltage appearing at the interconnection point 26 is positive and a fraction (1/181th) of that voltage is applied to the base electrode. This voltage is in a sense tending to forward bias the input junction. During pre-ignition, the voltage at 26 is a maximum and sufficient, assuming time has been allowed for the capacitor 31 to charge up, to forward bias the transistor 30 and initiate oscillation.

The trigger oscillator operates as a relaxation oscillator with the capacitor 31 recurrently charged through the passive elements of the operating network and recurrently discharged by the transistors 19, 30. The charging period of capacitor 31 is determined primarily by the value of capacitor 31, the value of resistor 35 and, as will be shown, the differential voltage applied to charge the capacitor 31. The capacitor 31 has one terminal coupled to the base of the transistor 30, the output tap on the voltage divider 34, 35, and the other terminal coupled to the base of the switching transistor 19. The other capacitor terminal is led to ground through one path involving the back-biased diode 28 serially connected with resistance 29, and a second path including the serially connected, low resistance, feedback windings 24, 23 to the unreferenced terminal of the lamp current sensing resistance 33. Assume that capacitor 31 is charging by current flow from the connection of resistors 34, 35 through windings 24, 23 and resistor 33. The discharge of the capacitor 31 starts when transistor 30 begins to conduct at the instant the forward threshold of the base-emitter junction is exceeded, and is completed after the transistor switch 19 is turned on by transistor 30. With both transistors conducting, both terminals of capacitor 31 are coupled through a conducting junction to a common point of the emitters, discharging the capacitor 31, and removing the forward bias on transistor 19, turning it off. As will be seen below, the turn off action of the transformer 30 leaves a residual inverse voltage (making the base of transistor 30 negative relative to the base of transistor 19) on the capacitor at the end of switch conduction.

As an examination of the circuit will show, when sufficiently high potentials are present at the interconnection point 26 and assuming a low lamp current so that there is only a small voltage drop across resistor 33, the transistor 30 will start to conduct when the capacitor 31 reaches the forward conduction voltage threshold (approximately 0.6 volts) for the input junction of the transistor 30 as indicated above. The voltage toward which the capacitor 31 charges is determined by the difference between the voltage at the voltage divider output and the voltage due to lamp current in resistor 33. The charging resistance for capacitor 31, regarding the voltage divider and current sensing resistor 33 as serially connected generators, is primarily the value of resistor 35 since resistor 34 is electrically in parallel and much larger than resistor 35. Resistor 33 is negligible because it is in series with (via capacitor 31) and much smaller than resistor 35. Thus, the time constant of the relaxation oscillator is determined primarily by the capacitor 31 and resistor 35, but the period between oscillator pulses is influenced by the difference between (a) the voltage drop across resistor 35 and (b) the voltage drop across resistor 33. Regarding the voltage divider as one generator, its charging voltage is derived from the interconnection point 26 and by a source resistance of 1000 ohms. From the capacitor terminal coupled (via windings 24 and 23) to current sensing resistance 33, the charging network is represented by a voltage source (a source of low internal impedance) equal to the arc lamp current times the two ohm resistance of resistor 33 and, as stated above, the charging resistance is essentially 1000 ohms.

Once the transistor 30 conducts, current flows in the primary feedback winding 23 and the strongly regenerative feedback action involving secondary feedback winding 24 produces a short duration trigger pulse for turning on transistor switch 19.

The initial starting conditions and charging interval for each oscillation of the relaxation oscillator are established by the operating network. The capacitor 31 is fully discharged when both transistors 19 and 30 become conductive. The capacitor 31 assumes a reverse charge (negative at the base of transistor 30) as a result of the feedback reversal in windings 23 and 24 attributable to maximum conduction by transistor switch 19. As conduction by transistor 19 ends, voltage of approximately 4 or 5 volts appear across capacitor 31 with a polarity to inhibit conduction by transistor 30. As the collector current flowing through the virtual toroid winding decreases a voltage of opposite polarity is induced in accordance with Faraday's law. The inverse voltage is limited by the serially connected diode 28 and resistor 29, and represents the starting point for each timing interval of the relaxation oscillator. While the transistor switch 19 is conducting, the virtual generators embodied by the voltage divider 34, 35 and the lamp sensing resistor 33 of the relaxation oscillator are inactive, precluding recharging of the capacitor 31, and precluding the starting of the next oscillation cycle.

Assuming that the lamp current has begun to flow and the voltage across the lamp has begun to decrease, the differential voltage used to charge capacitor 31 falls on the average, increasing the period required to turn on the transistor 30 and initiate the next trigger pulse. As will be described in more detail below, this provides more time for the energy stored in the input circuit of the operating network to be released to the lamp. The observed waveshapes confirm that during the glow to arc transition, the arc current decays before the succeeding trigger pulse occurs, indicating that the stored energy has been expended in the gas discharge lamp. Earlier in the starting cycle, the lamp cathode current may be truncated by the next conduction interval, and less stored energy is delivered to the lamp. The circuit has been designed so that the non-conduction intervals for transistor 19 are maximum when the lamp voltage is in the glow region (approximately 200–400 volts), to maximize the output power at about 9 watts for metal vapor lamps.

The principal function of the capacitor 31 is to serve as the integrating capacitor in the RC network used to time the off interval of the power transistor 19. During pre-ignition, ignition and the glow to arc transition region, high frequency operation continues, with the trigger oscillator recurrently turning on the transistor switch 19 while the transistor switch turns itself off through feedback reversal in the transformer 20. The trigger oscillator transistor 30 is turned off shortly after conduction by transistor switch 19 removes the conduction favoring charge on capacitor 31. Transistor 30 remains quiescent through the balance of switch conduction. Turn on of the transistor switch is achieved through the coupling of the base electrode of transistor 30 through the capacitor 31 to the base of transistor 19, the interconnection of the emitters of transistors 19 and 30 together, and the shared connection of the transistors 19 and 30 to the transformer feedback windings 23 and 24. When transistor 30 becomes forward biased, and starts to conduct, collector current is developed in the primary feedback winding 23. This produces the regeneration needed to create a trigger pulse on the order of 1/10th ampere and having a sub-microsecond duration at the secondary winding 24. The trigger current 23 flowing in the secondary winding 24 turns on the main switching transistor 19, initiating monostable switching action. Transistor 19 completes its conduction cycle, which is set by transformer design to be shorter than the interval between trigger pulses, and turns off in response to the reversal in feedback provided by the feedback windings 23, 24. High frequency operation of the switch continues so long as the trigger oscillator generates trigger pulses.

Once the arc discharge lamp has reached thermonic operation corresponding to warm-up, the high frequency output produced by transistor switching is designed to stop and the dc exitation state for the arc lamp commences. The trigger oscillator 30, which triggers the monostable transistor switch 19 into active operation, remains reversely biased due to a new set of current and voltage conditions in the operating network and becomes inactive. The rectified high frequency voltage at point 26, previously applied across the voltage divider 34, 35 is replaced by a sustained dc voltage with some ripple, representing the lamp voltage. The dc voltage continues in a sense favoring conduction, but is lower by 1 or 2 orders of magnitude. The diode 17, now forward biased, connects the voltage divider across the lamp, and the voltage divider now senses 1/181th of the new lamp voltage, initially 15 volts. Simultaneously, a maximum initial lamp current of 6/10$^{ths}$ of an ampere occurs in resistor 33, developing a conduction inhibiting voltage of approximately 1.2 volts. The differential voltage produces a reverse bias on the input junction of the trigger oscillator 30, inactivating it, and with it, the transistor switch 19.

As warm-up continues into final run condition, the lamp voltage rises and the lamp current falls. The lamp condition sensors are set to keep the trigger oscillator inactive through warm-up and final run. In final run, the lamp reaches a current of 0.37 ampere and a voltage of 87 volts. Should the lamp voltage rise 10 volts above the normal range of values (e.g., 97 volts), and the current fall to 0.050 ampere, then the trigger oscillator will be reactivated as a safeguard against transient dropout.

The operating network is designed to meet the increased power demand during the glow to arc transition without developing undue dissipation during a prolonged pre-ignition period. This accomodation of the operating network to the requirement of the lamp for additional energy during the glow to arc transition is achieved in part by the voltage and current responsive adjustment of the frequency of the trigger oscillator which affects the duty cycle of the switch 19 and in part by optimizing the transformer design. The change in duty cycle also reduces the filamentary energization, and the incandescent light output, produced by the pulsating dc component as noted earlier.

During the pre-ignition and ignition, the operating frequency (pulse repetition rate) of the trigger oscillator is approximately 50 kHz and it falls to 35 khz during the glow to arc transition in response to the differential voltage reflecting the voltage sensed by the voltage divider 34, 35 and the current sensed in resistor 33. During pre-ignition, the primary voltage is >300 V peak to peak while the gas discharge lamp draws no current. In the glow to arc transition, the maximum primary voltage falls to a value of about 150 volts peak to peak under the loading effect of the discharge lamp. In this state, metal vapor lamps draw significant current (0.2 ampere peak current pulses), and require the four watts of additional power referred to earlier. The voltage reduction on the voltage divider and the increase in sensed lamp current signals the need for more power.

The trigger oscillator responds to the reduction in the voltage across the voltage divider 34, 35 and the increase in lamp current during the glow to arc transition of the arc lamp by a decrease in the pulse repetition rate. The reduction in pulse repetition rate is attributable to the fact that the trigger oscillator is a relaxation oscillator. A reduction in voltage across the voltage divider 34, 35 reduces the voltage on the capacitor terminal associated with the base electrode of transistor 30, and an increase in lamp current increases the voltage on the capacitor terminal associated with the emitter electrode. The differential voltage, which is the means for charging the capacitor 31 through the resistor 35, is thus reduced, and with it the rate at which the capacitor 31 charges to the potential required to forward bias the base-emitter junction of the transistor 30, connected via winding 24 in shunt with capacitor 31, to start the next pulse. The decrease in frequency is a continuous variable, whose sensitivity may be adjusted to occur earlier or later in the glow to arc transition. The reduction to 35 kHz in the indicated circuit makes 9 watts of average power available for the main lamp when the main lamp is at approximately 250 volts with current peaks of about 0.2 amps.

The 50 to 35 kHz reduction in frequency of the trigger oscillator is accompanied by a decrease in the conduction duty cycle of transistor 19, which, as will be seen, facilitates the described power increase to the arc lamp. The interval between the trigger pulses is greater than the conduction interval of the switching transistor 19, the latter being determined by the magnetics. Thus, when the interval between trigger pulses is lengthened, the off time of the transistor 19 is increased, and a lower duty cycle results. At 50 kHz, transistor 19 conducts for an approximately 60% duty cycle, while at 35 kHz it conducts for an approximately 35% duty cycle.

The reduction in duty cycle of the transistor switch caused by a reduction in the pulse repetition rate provides some of the desired increase in power supplied to the discharage lamp. Assuming that a given amount of energy has been stored in the reactive elements during conduction, and that it is delivered to the main lamp at a given rate during non-conduction, an upward increase in off time may permit more of the stored energy to be delivered. This is in fact the case and an upward adjustment of the switch off time from 11 to 17 microseconds facilitates the supply of 50% additional energy to the arc discharge lamp during the glow to arc transition.

While energy storage in the operating network may be affected by the operating frequency, the primary parameters which effect an increase in energy delivered to the discharge lamp during the GAT period are the decreasing pulse repetition rate (i.e., increasing pulse repetition period) and the falling arc voltage. Increasing the pulse repetition period, which contains a relatively fixed transistor conduction interval, increases the switch off time, during which stored energy may be delivered to the arc discharge lamp. An examination of the current waveforms of the arc discharge lamp indicates that during a shorter off time, the current supplied to the lamp is still flowing when the switch becomes conductive. Substantial current will flow to the lamp for up to 15 microseconds using the indicated circuit parameters. The slow decay in the lamp current waveform is controllable by the values of the capacitance 25, the inductance 21 and the filamentary resistance 12 in the transformer primary circuit, (e.g., the smaller the filamentary resistance, the longer the time required for the energy to dissipate in the primary circuit, and the more protracted the flow of current to the gas discharge lamp due to the high voltage from winding 22.) To achieve the desired increase in energization, the time constant of the discharge in that primary circuit (6-7 microseconds) must be on the same order as the off times (7-15 microseconds) of the switching transistor 19.

A second factor which increases the power applied to the arc discharge lamp during the GAT period, has to do with a proper power match between the transformer and the arc tube. As the arc tube voltage falls, a better power match is realized when the arc voltage approaches a value approximately half the open circuit voltage of the transformer winding 22. If the arc tube voltage is appreciably below or appreciably above this value, less power will be delivered. The shape of the power curve is approximately quadratic in this region and the indicated turns ratio (140-640) produces an optimum power transfer at approximately 250 volts.

A third factor in achieving the ability to achieve both a large open circuit output voltage during pre-ignition and a high power transfer to the lamp during the glow to arc transition, and also influenced by the frequency shift, is the transformer leakage inductance. This is designed to be large by the selection of a large gap in the center leg of the magnetic structure, and the separation of the primary and secondary windings in separate pies with the separation near the air gap. The leakage inductance permits an increased resonant rise in the open circuit output voltage during pre-ignition. During the glow to arc transition, the effect of the leakage inductance, electrically in series with the lamp load, would be to reduce power to the lamp. However, by reducing the frequency of the waveform, the series reactance of the leakage is reduced and more power is available for the main lamp.

The arc lamp voltage is generally dropping to lower peak values throughout the GAT period, so it is useful to apply a power specification to a single voltage value corresponding roughly to a "glow voltage" of the lamp. Assuming a typical lamp load, a conservative specification of that power point will imply that the requisite power will be available throughout the glow to arc transition. The present supply has an approximately 9 watt capability when the voltage peak from winding 22 is 250-300 volts in amplitude. This is in excess of a typical lamp requirement of only 4 watts at the same voltage for the present miniature high pressure metal vapor lamp.

The foregoing discussion of the power "boost" to the arc discharge lamp during the glow to arc transition by reducing the repetition rate of the trigger oscillator and reducing the percentage of conduction time of the transistor switch, is not complete without a consideration of the effect of this change open the energization provided to the standby filament. In overly simple terms, power is supplied to the dc filament when the transistor switch is on and none is supplied when the transistor switch is off. Similarly, power is supplied to the gas discharge lamp when the transistor switch is off and none is supplied when the transistor switch is on. Decreasing the percentage of on time tends to decrease the supply of power to the filament (and its lumens output), and increasing the off time tends to increase the supply of power to the arc discharge lamp (and its lumens output).

The foregoing simplification provides the practical basis for changing the optimization of the power supply to the dissimilar needs of the standby lamp and the discharge lamp at different points in the starting procedure. More particularly, the percentage of on time may be set to meet the requirements for a desired level of standby illumination during pre-ignition and reset to meet the increased power demands of the main lamp during the low voltage region (e.g., 250 volts) in the glow to arc transition. The optimization generally permits minimization of the size of the magnetics and other components to meet predetermined output criteria.

In practical terms, when the transistor switch 19 is operated at the higher frequency (50 kHz), the percentage of on time of the switch is larger (although the "on" time of each conduction interval is substantially constant and set by the magnetics), allowing more energy to be provided to the standby filament from the dc source through the switch. Operating at the lower frequency (35 kHz) increases the percentage of off time of the switch and allows more energy to be provided to the arc discharge lamp since the energy is discharged at a finite rate. This energy increase meets the needs of the discharge lamp during the glow to arc region. During pre-ignition and ignition, little energy is needed by the main lamp, and the higher repetition rate is unobjectionable for the main lamp since it does not significantly compromise the ignition and pre-ignition process. The foregoing setting is therefore optimized at 50 kHz in accord with the need for sufficient filamentary energization (~56 watts) for the desired level of standby illumination. During the glow to arc transition, when the lower repetition rate is employed, the percentage of on time of the switch is reduced, bringing about a reduction in the pulsating dc current fed from the dc source through the switch. However, circulating current in the primary circuit increases and generally offsets much of the loss in pulsating dc current. The glow to arc transition period is short (less than 2 seconds) and any change in standby illumination is unimportant when compared to the major advantage of providing more glow to arc transition energy to the main lamp. The 50 kHz to 35 kHz frequency shift produces an approximately 50% increase in available glow to arc energy and results in a less than 5% reduction in standby illumination.

For the foregoing reasons, the duty cycle is readjusted from one value in which filamentary energization is optimized (56 watts) at a desired 800 lumens of standby illumination during pre-ignition and ignition to another value in which the power to the arc lamp is optimized in the glow to arc transtions to provide a power boost to insure that the lamp transitions to warm-up smoothly and with a high degree of certainty.

The power available for the glow to arc transition is not reduced in the dimming mode because the dimming resistance (filamentary resistance 13) is cold during ignition and pre-ignition (since capacitor 27 and diode 17 preclude current pulses therethrough until the arc lamp starts to conduct) and it remains cold and thus at a lower resistance through the glow to arc transition. The resistance remains low enough to prevent a substantial reduction in the power available for the lamp during the glow to arc transition. The dimming resistance is in the secondary circuit of the power transformer and experiences no significant current flow until the glow to arc transition produces the first significant lamp current. The glow to arc transition is sufficiently short, taking into account the current levels, to prevent significant heating of the filamentary dimming resistance 13 and it remains at a low value until warm-up occurs.

The power transformer 20 which is employed in the operating network is the invention of W. Peil and R. J. McFadyen and the subject of the copending application Ser. No. 139,946 referred to earlier. The core structure and the windings (21, 22, 23, 24) of the power transformer are illustrated in FIG. 4. More particularly, the core comprises two E cores arranged in an "8" core configuration with an air gap in the common leg. An aperture 43 is provided in the upper E core, as shown in FIG. 4, at the base of the common leg. The aperture is bounded by three contiguous regions, each defining a flux path and collectively forming a small virtual toroid. The first region provides a path between the common leg and the upper left portion of the upper E core; the second region provides a path between the common leg and the upper right portion of the upper E core; and the third region provides a path between the upper left and upper right portion of the upper E core.

The primary and secondary power windings are wound on a bobbin 42 around the common branch of the core in three pies, one being assigned to the primary winding and two to the secondary winding, the primary winding occupying the upper portion of the bobbin in proximity to the aperture 41. The division separating primary and secondary windings occurs near the air gap to increase the leakage between primary and secondary windings. The division of the secondary winding into the pies minimizes the distribution capacity and reduces the voltage stresses in the secondary winding.

The feedback windings 23 and 24, which are wound through the aperture 41 and about the upper portion of the upper E core, provide a mechanism for monostable transistor operation. As explained in the earlier cited application, if the transformer 20 is connected to the transistor 19 in the manner generally illustrated in FIG. 2, with the secondary feedback winding coupled to the input junction and the primary feedback winding and the primary power winding connected to carry collector current, and further assuming a trigger pulse to initiate transistor conduction, then conduction will occur for a short period and terminate. The result is the production of an approximately rectangular output waveform with high overall efficiency.

The feedback windings 23, 24 provide monostable operation by supplying feedback to the transistor responsive to the magnetic state of the core which reverses in sense when a predetermined toroidal region becomes saturated from the build-up of collector current. Initial regenerative feedback is provided between primary feedback winding 23 and secondary feedback winding 24, close coupling being provided by the virtual magnetic toroid. When one region of the magnetic toroid saturates, direct coupling between the primary feedback winding and the secondary feedback winding is substantially reduced and feedback in another sense is applied to the secondary feedback winding 24 as a joint result of the sudden increase in reluctance coupling the two windings; the constant voltage effect of the transistor input junction acting with the inductance of the secondary winding to constrain the rate of change in flux in the outer region; and the stored charge at the junction which supports a reversal in current flow and whose removal completes the transistor turn off. The arrangement produces an automatic turn off of the transistor prior to the core achieving full saturation, resulting in increased transistor switching efficiency and more reliable operation of the transistor by avoiding the stresses which would automatically occur should the core be driven to saturation. The design also permits substantial reductions in the amount of ferrite material required for a pre-determined power level.

In a practical embodiment of the present application, the winding counts are as illustrated in FIG. 2 and the core has the external dimensions of 0.760"×0.64"×0.1875", the aperture having a diameter of 0.040", spaced 0.0738" from the outer surface. The air gap of the center leg is 0.030". The outer leg is 0.09374" wide and the center leg is of double width. The E cores are made of the Stackpole 24B ferrite material, catalog 57.04340, the upper E core being modified by the introduction of the aperture and the shortening of the center leg. The bobbin 42 is designed to fit within the openings of the figure "8" core, with the windings themselves having a rounded rectangular outline generally approximately ⅜"×3/32" thick and separated by 0.030" spacers.

The foregoing operating unit supplies the requisite electrical energy to the standby filamentary resistance and the arc discharge lamp for starting and normal operation, including "arc" maintenance during short reductions in the line voltage. The final output for operation of the lamp is dc with a tolerable degree of 120 hertz ripple. The ripple is not necessary, but its removal beyond a certain point costly. The energization of the standby filamentary resistance during the warm-up period is of the same nature—dc with 120 hertz ripple. During the earlier starting period, the standby energization is primarily unidirectional pulses at above audible frequencies arising from conduction in the transistor switch, and secondarily circulating or "alternating" currents in the primary circuit of the transformer, which primary circuit includes the standby filament. The term "pulsating" has been employed in a sense to include both elements of standby energization. The arc discharge lamp derives its power, during starting, from these "alternating" voltages which are applied to the transformer primary for transformation. In short, both the filament excitation and the energy applied to the transformer primary are periodic quantities. The transformed quantities are rectified and delivered to the discharge lamp primarily in the form of unidirectional high voltage pulses.

Figure 5:
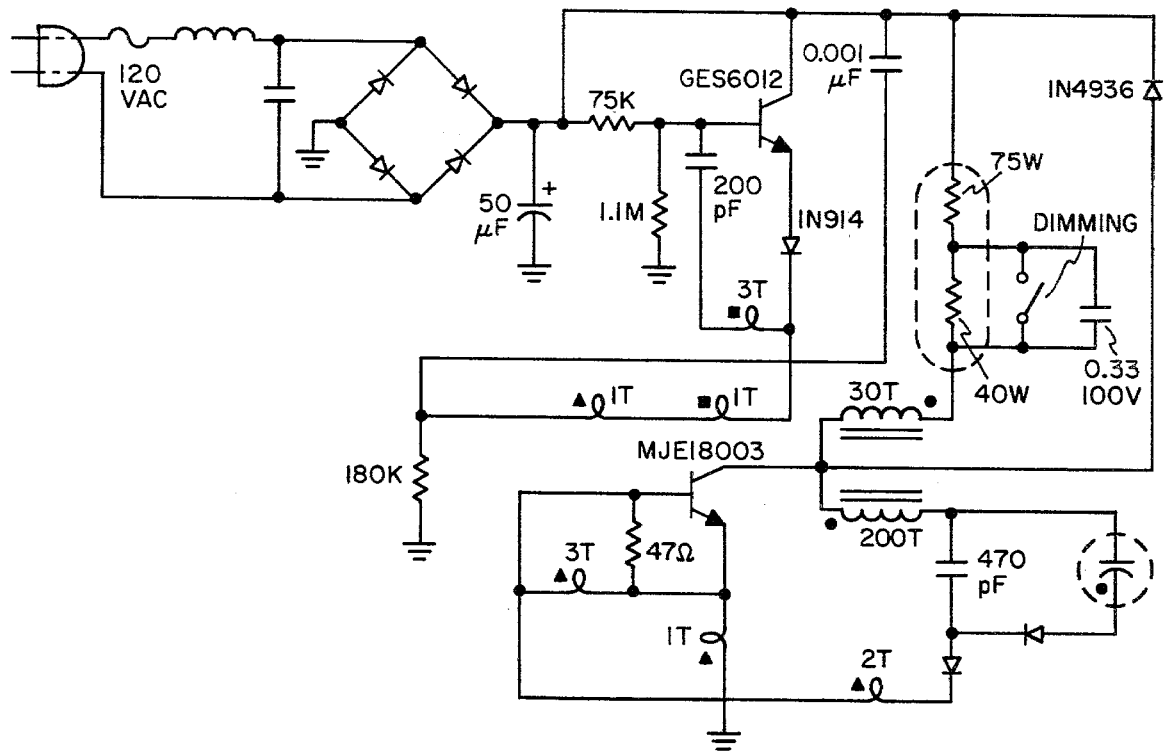
FIGS. 5, 6, 7 and 8 are electrical circuit diagrams of alternate, practical embodiments of the lighting unit.
Figure 6:
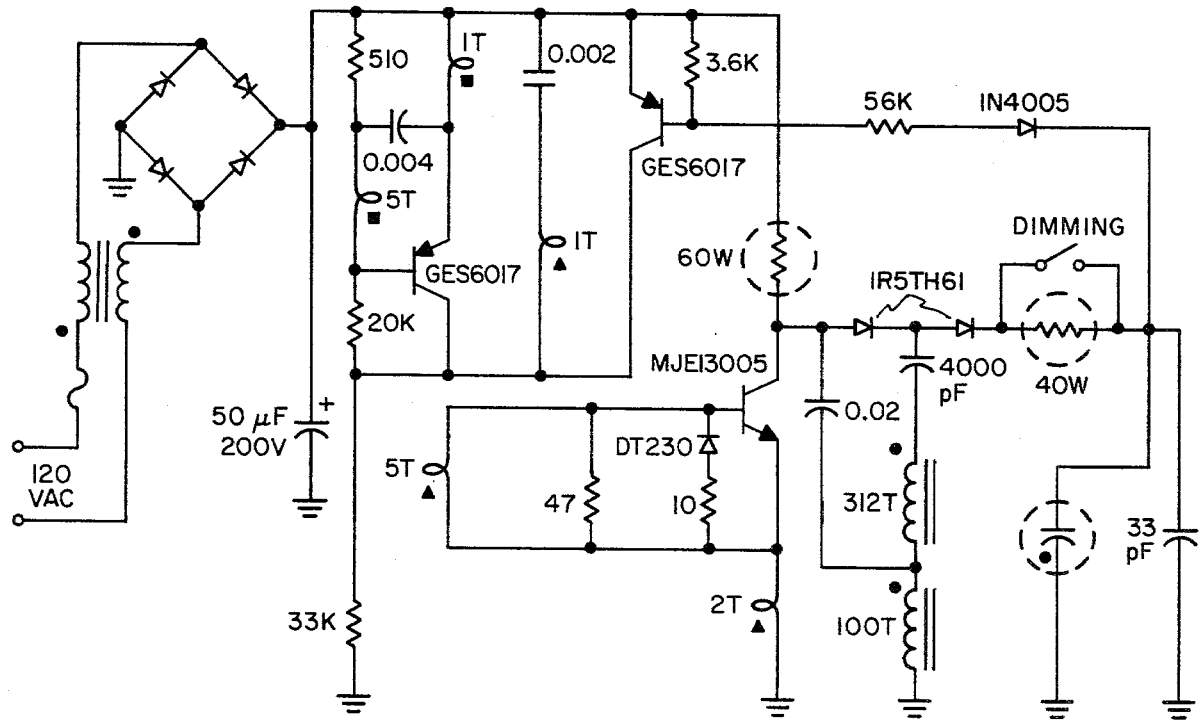

While a single circuit embodiment of the operating network has been discussed so far, other variations lying within the scope of the invention exist and are depicted in FIGS. 5, 6, 7 and 8. As shown in FIG. 5, in the event that some increase in core size is unobjectionable, the filamentary resistance, the primary winding, the secondary winding, and the main lamp may be serially connected in the order recited between the B+ and the reference terminals respectively, with the transistor switch being connected between the winding interconnection and the reference terminal. An additional diode to complete the ac input circuit is connected between the B+ terminal and the winding interconnection. The ballast and dimming resistance may be the first and second elements in the series path or the dimming resistance may be separated and introduced after the second winding. In the FIG. 5 circuit, the ballast is in series with the primary winding of the transformer, and not in shunt as previously illustrated in FIG. 2. The diode connected in shunt with the serially connected ballasting filament, and primary winding (etc.) provides a path for "flyback" current. In addition, the high voltage output circuit contains the diodes and significant capacity across the electrodes of the lamp to provide voltage doubling action applying a negative starting voltage.

In the event that a dc current through the transformer is undesirable, several circuit variations are also possible. In one circuit variation shown in FIG. 6, the filamentary resistance, a pair of diodes, a dimming resistance and the lamp are serially connected in the order recited between the B+ and reference terminals, respectively, and the transistor switch is coupled between the terminal of the first filamentary resistance remote from the B+ terminal and ground. The transformer has one end terminal connected to the reference terminal, the other end terminal capacitively coupled to the point between the diodes, and the transformer tap is capacitively coupled to the switch and the first filamentary resistance interconnection. In the FIG. 6 circuit, the primary transformer winding, the tap connected capacitor, and the 60 watt ballasting filament are serially connected across the dc supply. At the same time the transistor switch is connected in series with the ballasting filament across the dc supply and in shunt with the primary winding and that capacitor. In the circuit, the switch may be regarded as shunting the primary winding, and the ballast filament provides the flyback path for the primary circuit. The high voltage output capacitor is small, and while an isolating diode is provided, the doubling action is weak, and collapses under load.

Figure 7:
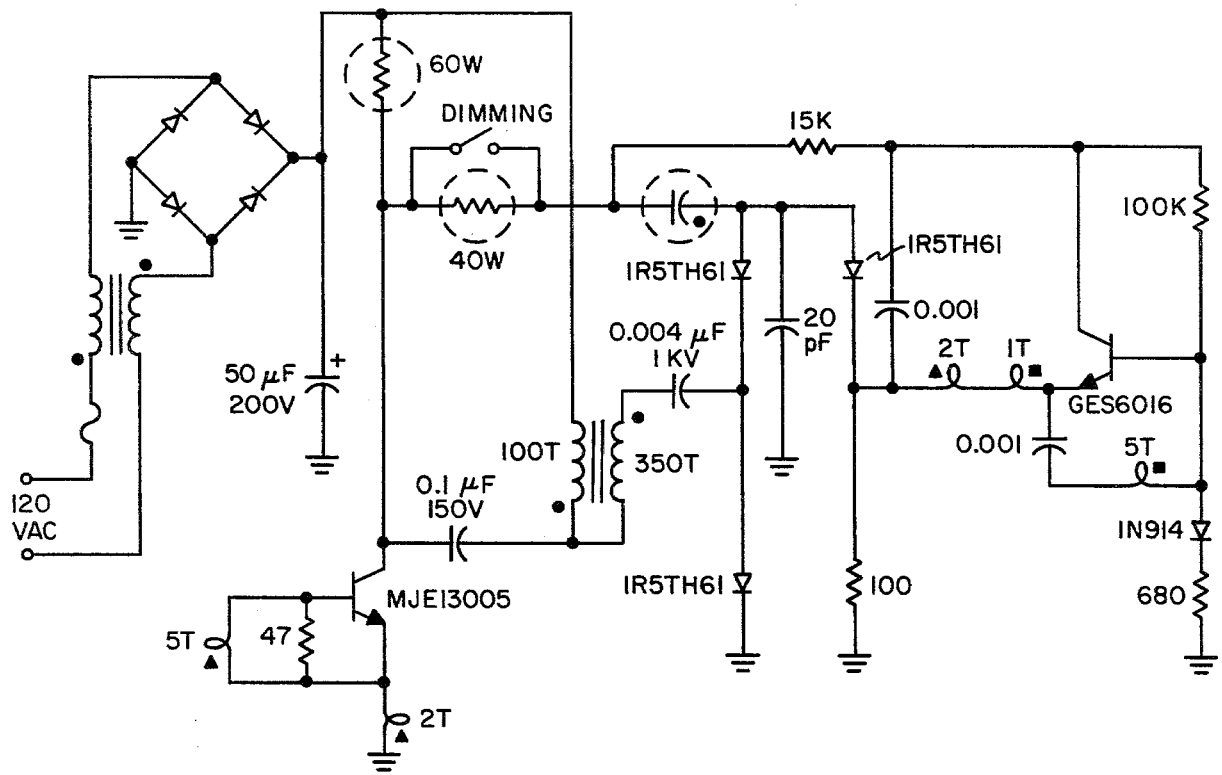

A further variation in which direct current flow in the transformer is avoided, is one in which the ballasting filamentary resistance, the dimming filamentary resistance, the arc lamp and a pair of diodes are serially connected in the order recited between the B+ terminal and the reference terminal as shown in FIG. 7. The transistor switch is connected between the interconnection between filamentary resistances and the reference terminal. The transformer has the end terminal of the primary winding connected to the B+ terminal, the end terminal of the second winding capacitively coupled between the diodes, and the interconnection between windings capacitively coupled to the ungrounded electrode of the transistor switch. In the FIG. 7 arrangement, a negative standby voltage is used, and capacitors are at the tap and output terminal of the transformer. The transistor switch is now connected in series with the ballasting filament across the dc supply, and in series with the transformer primary across the dc supply. Thus, the ballasting filament provides the flyback path.

Figure 8:
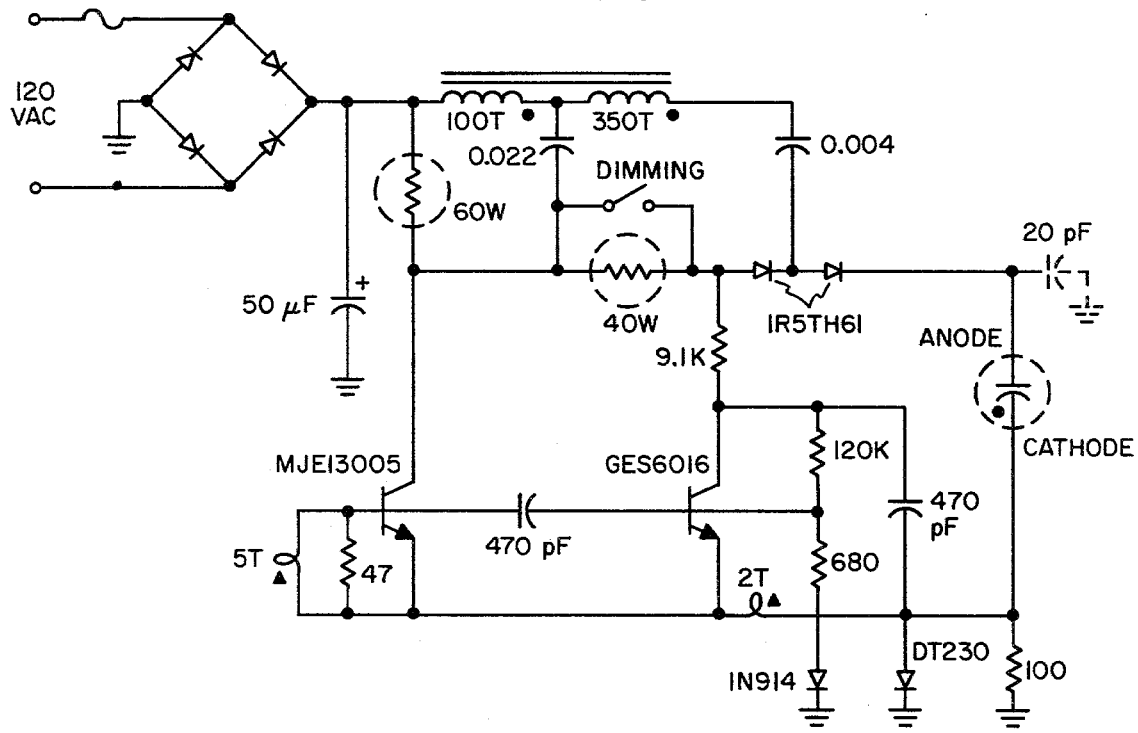

A further variation having substantial similarity to the preferred embodiment is one in which the ballasting filamentary resistance, the dimming filamentary resistance, a diode pair and the arc lamp are serially connected in the order recited between the B+ terminal and the reference terminal. This is as shown in FIG. 8. The transistor switch is connected between the interconnection between filamentary resistances and the reference terminal. The transformer has one end terminal connected to the B+ terminal, the other end terminal capacitively connected between the diodes, and the winding interconnection point capacitively connected to the interconnection between filamentary resistances. The configuration is different from the FIG. 2 arrangement primarily in the presence of the isolating diode, which provides, in connection with the output capacitor, soft doubling action.

While a magnetic transformer has been shown as a specific example of an alternating electrical energy transforming means, other forms are also possible but generally of lesser convenience in the present application of the invention. Substitution is possible because the voltage transformation means is used for igniting the lamp and not for eventual running operation. In addition, the filament energization with its high current demands, is not dependent during starting on the voltage transformation means. The magnetic transformer is preferred in that it provides a low cost, reliable approach and presents an inductive impedance to the arc lamp which has been found by experience to be an aid in glow to arc transitioning. Such other transformation means include piezoelectric transformers, flyback inductors and capacitive multipliers. The piezoelectric transformer is more expensive and requires special feedback to accommodate the very high "Q" and consequent narrow bandwidth requirements of the drive. The flyback inductor requires semiconductor switches having high voltage ratings which are expensive and not available in small packages. The capacitive multipliers are less desirable because they do not accomplish the GAT function as well as inductive impedance means. In other applications of the invention, these objections may be of different significance.

What is claimed as new and desired to be secured by Letters Patent of the United States is:

1. A lighting unit comprising:
   A. a dc power source having two output terminals, one a reference terminal,
   B. a metal vapor arc discharge lamp requiring energization dependent on its electrical state, and
   C. an operating network comprising:
      (1) an incandescible resistive filament exhibiting a substantial resistance increase with applied voltage to provide standby light for said lamp,
      (2) alternating electrical energy transforming means for coupling a stepped up output voltage to said lamp,
      (3) switching means,
      (4) interconnecting means for coupling current from said dc source
         (a) in a dc form to said filament and said lamp in series for energizing and ballasting said lamp, the dissipation in said filament being too low to produce useful light during normal running operation of said lamp, when said switching means is in a stable first condition, and
         (b) in a periodic form to said resistive filament and switching means in series for producing useful light and in a periodic form to the input of said transforming means for starting said lamp, when said switching means is in an astable, second condition, and
      (5) means responsive to the electrical conditions of said lamp for maintaining said switching means in said first condition during warm-up and normal running operation of said lamp, and in said second condition during other operating states of said lamp.

2. A lighting unit as set forth in claim 1 wherein the dissipation in said filament is sufficient to produce useful light during early warm-up of said lamp, the dissipation being reduced as said lamp warms up.

3. A lighting unit as set forth in claim 2 wherein said second condition of said switching means occurs during pre-ignition, ignition and glow to arc transition of said lamp, and said first condition is nonconductivity, said first condition occuring during warm-up and normal running operation of said lamp.

4. A lighting unit as set forth in claim 3 wherein said dc power source comprises a bridge rectifier and a filter capacitor for energization from a conventional ac main.

5. A lighting unit as set forth in claim 3 wherein said transforming means is a transformer having a primary winding,
said switching means is a solid state switch,
said filament being connected in parallel with said primary winding, the parallel combination being connected in series with said switch across said dc source,
said astable operation of said switch providing said periodic current in said filament and in said transformer input.

6. A lighting unit as set forth in claim 5 wherein said switch is normally nonconductive in said first condition; said switching becoming conductive for a predetermined conduction interval in response to a trigger pulse and then returning to a nonconductive state in said second condition.

7. A lighting unit as set forth in claim 6 wherein said operating network further comprises:
   (C6) a first capacitor serially connected with said main primary winding to permit ac and prevent dc current flow therein.

8. A lighting unit as set forth in claim 7 wherein said transformer comprises a second winding, said stepped-up output voltage being derived from one terminal thereof and the other terminal thereof being connected to said primary winding, and wherein said operating network further comprises:
   (C7) a diode connected in the series path between said filament and said lamp, poled to permit said current in a dc form when said switch is in said first condition, and
in parallel with said second winding for rectifying the stepped-up output voltage coupled to said lamp, and poled to permit said stepped-up output voltage during the non-conductive instants in the second condition of said switch.

9. A lighting unit as set forth in claim 8 wherein said operating network further comprises:
   (C8) a second capacitor serially connected with said second winding to permit ac and prevent dc current flow therein.

10. A lighting unit as set forth in claim 3 wherein said lamp responsive means is responsive to current and voltage conditions in said operating network dependent on the state of said lamp.

11. A lighting unit as set forth in claim 9 wherein said lamp responsive means initiates and sustains said second switch condition when
the current in said lamp is sufficiently small, corresponding to pre-ignition, ignition or glow to arc state of said lamp, and
the voltage on the path between filament and diode in respect to said reference terminal is sufficiently high, during said non-conductive instants, said voltage reflecting the loading on said operating network by said lamp during said three last recited lamp states.

12. A lighting unit as set forth in claim 11 wherein said lamp responsive means terminates said second switch condition, initiating and sustaining said first switch condition when
the current in said lamp is sufficiently high, corresponding to warm-up and normal running states of the lamp, and
the voltage on the path between filament and diode in respect to said dc reference terminal is sufficiently low, corresponding to said two last recited lamp states.

13. A lighting unit as set forth in claim 12 wherein said lamp responsive means includes means for initiating said second switch condition, when said switch is in said first condition, when
the current in said lamp falls to an arbitrary value, less than normal running current, and
the voltage on the path between filament and diode in respect to said reference terminal rises to an arbitrary value above normal running voltage;
said arbitrary values corresponding to a lamp state likely to result in its extinction.

14. A lighting unit as set forth in claim 9 wherein said lamp responsive means comprises:

(C5a) a lamp current sensing resistance serially connected between said lamp and said reference terminal in which a first voltage proportional to lamp current is produced, (C5b) a voltage divider connected between the path between filament and diode, and said reference terminal for producing a second voltage which during non-conductive instants in said second switch condition is indicative of lamp loading and which during said first switch condition is indicative of lamp voltage, and (C5c) means connected between said current sensing resistance and the output of said voltage divider for response to the difference between said first and second voltages.

15. A lighting unit as set forth in claim 14 wherein said means for response to the difference between said first and second voltages comprises an oscillator, the oscillatory condition thereof being dependent on said difference, for coupling conduction inducing trigger pulses to said first transistor, and said oscillator comprising a second transistor.

16. A lighting unit as set forth in claim 15 wherein said transformer comprises a magnetic core; current flow in said primary winding during conduction of said first transistor causing an increase in flux in said core, and feedback winding means sensitive to the flux level in said core for turning off said first transistor prior to full core saturation, said feedback winding means comprising a primary and a secondary feedback winding coupled to said first transistor for providing feedback which reverses from conduction aiding to conduction inhibiting when a predetermined flux level is achieved in said core.

17. A lighting unit as set forth in claim 16 wherein both said transistors are junction transistors each having a base, an emitter and a collector electrode, and wherein both said emitter electrodes are connected together, and through said primary feedback winding to said reference terminal, and said secondary feedback winding is electrically coupled between the base and emitter electrodes respectively of said first and second transistors.

18. A lighting unit as set forth in claim 17 wherein said secondary feedback winding is direct coupled to the base electrode of said first transistor, and wherein said oscillator is a relaxation oscillator comprising a third capacitor connected between said base electrodes for capacitive feedback coupling to said second transistor and for timing the relaxation period.

19. A lighting unit as set forth in claim 18 wherein said lamp current sensing resistance is connected in the series path between said emitter electrodes and said reference terminal, and the base electrode of said second transistor is connected to the output of said voltage divider for applying the voltage difference between said first and second voltages across the input junction of said second transistor, said third capacitor charging at a rate proportional to said voltage difference with said second transistor generating a trigger pulse for turning on said first transistor when the voltage on said capacitor becomes sufficient to forward bias the input junction thereof, conduction of said transistors discharging said third capacitor and turning off said second transistor, said feedback reversal turning off said first transistor and creating a conduction inhibiting initial voltage on said third capacitor when charging resumes.

20. A lighting unit as set forth in claim 19 wherein said lamp is a high pressure metal vapor arc discharge lamp, and said operating network stores electrical energy in said transformer and said first capacitor during the conductive instants of said switch in said second condition, the stored power being transferred to said lamp during the non-conductive instants, the charging rate of said first capacitor during pre-ignition having a first value corresponding to a first, higher pulse repetition rate selected to establish a first percentage of switch conduction time to establish a desired level of standby illumination, and during the glow to arc transition having a second value corresponding to a second, lower pulse repetition rate selected to establish a second reduced percentage of switch conductiontime to increase the power available for establishing the arc in said lamp.

21. A lighting unit as set forth in claim 8 wherein said lamp is a high pressure metal vapor arc discharge lamp, and said operating network stores electrical energy in said transformer and said first capacitor during conductive instants of said switch in said second condition, stored power being transferred to said lamp during the non-conductive instants, the power transfer capability being greater during said glow to arc transition than during pre-ignition or ignition.

22. A lighting unit as set forth in claim 21 wherein the turns ratio of said transformer is selected for optimum power transfer to said lamp during the glow to arc transition.

23. A lighting unit as set forth in claim 22 wherein the frequency of intermittent operation of said switch, which has one value during pre-ignition and ignition, is reduced to a lower value during the glow to arc transition, and said transformer is designed with substantial leakage for resonant enhancement of the peak voltage when lightly loaded to facilitate lamp ignition, said lower frequency during the glow to arc transition minimizing the reduction in power transfer by reducing the reactance thereof.

24. A lighting unit as set forth in claim 21 wherein said main lamp responsive means comprises:
means for establishing a given percentage of switch conduction time during pre-ignition to establish a desired level of standby illumination, and
means responsive to glow to arc transition conditions of said lamp for reducing the percentage of switch conduction time to increase the power to said main lamp.

25. A lighting unit as set forth in claim 8 which may be dimmed comprising:
(C9) a second resistive filament exhibiting a substantial resistance increase with applied voltage inserted in the path between said first filament and said diode having a value selected to reduce the operating current of said lamp for dimmed operation, and
(C10) a switch connected in shunt with said second resistance element for selecting dimmed or undimmed operation.

26. A lighting unit as set forth in claim 1 wherein said resistive filament is positioned to irradiate the interior of the lamp for improved starting.

27. A lighting unit adapted to be energized from an electric power source, said unit comprising in combination:
A. a metal vapor arc lamp,
B. an incandescible resistive filament,
C. means including switching means energized from said power source for generating recurrent, timespaced high voltage pulses during operation of said switching means and applying said pulses to said lamp for ignition to initiate arc conduction,
D. means operative during and as an incident to operation of said switching means for supplying current from said power source through said filament to cause the latter to emit useful incandescent light,
E. means operating when arc conduction is established for supplying energizing current from said power source to said lamp, and
F. means responsive to the electrical conditions of said lamp for turning off said switching means (C) when arc conduction exits.

28. The combination set forth in claim 27 wherein said means (D) also includes:
said switching means; said filament and said switching means being connected together for energization from said power source, activation of said switching means supplying a periodic current through said filament to cause the latter to emit useful light.

29. A lighting unit adapted to be operated from an electric power source, said unit comprising in combination:
A. a metal vapor arc lamp requiring energization dependent on its electrical state, and
B. an operating network comprising:
(1) an incandescible resistive filament,
(2) alternating electrical energy transforming means for coupling a stepped-up output voltage to said lamp,
(3) switching means, and
(4) means interconnecting said filament, said switching means, said transforming means and said power source for coupling a periodic current from said power source to said filament for useful light production; and for coupling a periodic current to the input of said transforming means for starting said main lamp, when said switching means is in an astable, second condition, and
(5) means responsive to the electrical state of said lamp for maintaining said switching means in a stable, first condition during warm-up and normal operation of said main lamp, and in said astable, second condition during other operating states of said lamp.

30. The combination set forth in claim 29 further characterized in that
said means (B4) includes a series path across said power source through said filament and said lamp, whereby said filament acts as a ballast for the arc lamp after arc conduction has been initiated.

31. A lighting unit adapted to be energized from an electric power source and comprising, in combination
A. a metal vapor arc lamp,
B. an incandescible resistive filament,
C. means, energized from said power source, for simultaneously supplying high voltage pulses to said lamp to produce ignition thereof while energizing said filament to create useful light output therefrom, and
D. means, energized from said power source, and operable after said lamp has achieved arc conduction, for feeding current to said lamp through said filament as a ballast, said means (D) including
(D1) means for establishing the normal running arc lamp current at a level which causes the dissipation in said filament to be low for efficiency, not productive of useful light,
whereby start-up of said lighting unit produces immediate incandescent light output followed by electrically efficient light production during normal running operation of said lamp.

32. A lighting unit adapted to be operated from an electric power source, said unit comprising in combination
A. a metal vapor arc lamp requiring energizing dependent on its electrical state, and
B. an operating network comprising:
(1) an incandescible resistive filament,
(2) alternating electrical energy transforming means for coupling a stepped-up output voltage to said lamp,
(3) switching means, and
(4a) means interconnecting said filament, said switching means, said transforming means and said power source to coupling a periodic current from said power source to said filament for useful light production; and for coupling a periodic current to the input of said transforming means for starting said lamp, when said switching means is in an astable, second condition, and
(4b) means interconnecting said filament means and said main lamp in series across said power source for energizing and ballasting said lamp at a normal running lamp current at which the dissipation in said filament is low for efficiency, not productive of useful light, when said switching means is in a stable, first condition.

33. The combination set forth in claim 32 having in addition thereto
(C5) means responsive to the electrical state of said lamp for maintaining said switching means in said stable, first condition during warm-up and normal operation of said lamp, and in said astable, second condition during other states of said lamp.

34. The combination set forth in claim 33 wherein said arc lamp is a high pressure metal vapor arc lamp requiring appreciable glow to arc transition power, and
said electrical energy transforming means is designed for optimum power transfer to said lamp during the glow to arc transition.

35. The combination set forth in claim 34 wherein said switching means comprises a first solid state device, and
said lamp state responsive means comprises a solid state oscillator coupling conduction inducing trigger pulses to said first solid state device.

36. The combination set forth in claim 35 wherein the transfer of power from said operating network to said lamp is frequency dependent, and wherein the frequency of said trigger oscillator is responsive to the electrical condition of said lamp, said oscillator frequency being adjusted for maximum power transfer to said lamp during the glow to arc transition.

37. The combination set forth in claim 36 wherein the oscillatory state of said trigger oscillator is responsive to said lamp state during starting, oscillator turn on occurring with the lamp nonconductive and turn off occurring with the lamp entering warm-up with substantial current and low voltage; and during normal running operating for immunity to transient loads, turn-on occurring when the lamp current and/or voltage change to a lamp condition likely to result in extinction of the arc.

38. A lighting unit adapted to be energized from an electric power source, said unit comprising in combination:
A. a metal vapor arc lamp requiring energization dependent on its electrical state, and
B. an operating network comprising:
  (1) an incandescible filament for providing standby light, having a predetermined resistance and a positive temperature coefficient of resistance,
  (2) alternating electrical energy transforming means for coupling stepped-up output voltage to said lamp,
  (3) switching means having a stable first condition and an astable second condition,
  (4) interconnection means for coupling current from said power source,
    (a) in a periodic form to said filament to provide a first useful light output and in a periodic form in the input of said transforming means for starting said lamp, when said switch is in said second condition, and
    (b) to said filament means and said lamp in series for energizing and ballasting said lamp when said switching means is in said first condition, the characteristics of said power source, said filament and said lamp being selected to provide a second useful filament light output at the beginning of warm-up of said lamp, and a progressive reduction in filament dissipation, and consequent reduction in filament light output as the light output of said arc lamp progressively rises during warm-up, and
  (5) means responsive to the electrical condition of said lamp for maintaining said switching means in said first condition during warm-up and normal operation of said lamp, and in said second condition during other operating states of said lamp.

39. The combination set forth in claim 38 wherein the characteristics of said power source, said filament, and said lamp are selected to make said second useful filamentary light output approximately equal to said first useful filamentary light output.

40. The combination set forth in claim 39 wherein a UV absorptive jacket is provided, and the characteristics of said power source, said filament, and said arc lamp are selected to produce a low filamentary dissipation insufficient to produce useful light in the normal running state of said lamp and yet large enough to cause self destruction of said filament in the event of damage of said jacket.

41. A lighting unit as set forth in claim 3 wherein, said lamp responsive means is responsive to current conditions in said operating network dependent on the state of state lamp.

42. A lighting unit as set forth in claim 41 wherein said lamp responsive means initiates and sustains said second switch condition when the current in said lamp is sufficiently small, corresponding to pre-ignition, ignition or the glow to arc transition states of the lamp.

43. A lighting unit as set forth in claim 42 wherein said lamp responsive means terminates said second switch condition, initiating and sustaining said first switch condition when the current in said lamp is sufficiently high, corresponding to warm-up and normal running states of the lamp.

44. A lighting unit as set forth in claim 43 wherein said lamp responsive means includes means for initiating said second switch condition, when said switch is in said first condition, when the current in said lamp falls to an arbitrary value, less than normal running current.

* * * * *